US008621806B2

(12) United States Patent
Studebaker et al.

(10) Patent No.: US 8,621,806 B2
(45) Date of Patent: Jan. 7, 2014

(54) COMPOSITE JOIST FLOOR SYSTEM

(75) Inventors: Glenn Wayne Studebaker, Norfolk, NE (US); David Lee Samuelson, Madison, NE (US); Lionel Edward Dayton, Norfolk, NE (US); Richard Lukes, Decorah, IA (US)

(73) Assignees: Nucor Corporation, Charlotte, NC (US); Asia Fastening (US), Inc., Wilmington, DE (US)

( * ) Notice: Subject to any disclaimer, the term of this patent is extended or adjusted under 35 U.S.C. 154(b) by 205 days.

(21) Appl. No.: 12/709,102

(22) Filed: Feb. 19, 2010

(65) Prior Publication Data
US 2010/0275544 A1    Nov. 4, 2010

Related U.S. Application Data

(63) Continuation-in-part of application No. 12/019,329, filed on Jan. 24, 2008, now Pat. No. 8,230,657.

(51) Int. Cl.
*E04B 1/18* (2006.01)

(52) U.S. Cl.
USPC .................. 52/414; 52/321; 52/650.3; 52/319

(58) Field of Classification Search
USPC ............. 52/321, 414, 798.1, 650.3, 167, 319, 52/335, 336, 337, 450, 783.11, 783.14, 52/674, 840; 411/387.1–387.7, 401, 424, 411/389
See application file for complete search history.

(56) References Cited

U.S. PATENT DOCUMENTS 3,307,304 A    3/1967   Klausner
3,363,379 A    1/1968   Curran
(Continued)

FOREIGN PATENT DOCUMENTS

CA    2407253 A1    4/2004
WO    2004031507 A1    4/2004
WO    2008116269 A1    10/2008

OTHER PUBLICATIONS

Lauer, Douglas F., "Ultimate Strength Analysis of Partially Composite and Fully Composite Open-Web Steel Joists"; Master's Thesis Paper, Virginia Polytechnic Institute and State University, Blacksburg, VA, Oct. 1994; Digital Library and Archives [Online]: http://scholar.lib.vt.edu/theses/available/etd-06112009-063330/unrestricted/LD5655.V855_1994.L384.pdf; URN: etd-06112009-063330; pp. 1-288.

(Continued)

*Primary Examiner* — William Gilbert
*Assistant Examiner* — Patrick Maestri
(74) *Attorney, Agent, or Firm* — Hahn, Loeser & Parks LLP; Arland T. Stein

(57) ABSTRACT

The composite joist floor system includes joists supporting metal decking and a stand-off fasteners are spaced along the length of the joist Each fastener has an upper portion with a through hardness between HRB 70 and HRC 40 and a lower portion having a threaded portion with a through hardness of between HRB 70 and HRC 40 and a thread-forming portion adjacent the threaded portion with at least a HRC 50 hardness and failure torque to thread-forming torque of at least 3.0 and a drive torque at least 20% less than a thread-forming torque, and a fluted lead portion adjacent the thread-forming portion with a nominal diameter between 70 and 95% of major diameter of the threaded portion adapted to form a fastener opening. These stand-off fasteners extend into and are encapsulated by a cementitious slab supported by the metal decking to form a composite floor system.

68 Claims, 29 Drawing Sheets

(56) References Cited

U.S. PATENT DOCUMENTS

| | | |
|---|---|---|
| 3,392,499 A | 7/1968 | McManus |
| 3,397,497 A | 8/1968 | Shea et al. |
| 3,457,818 A | 7/1969 | McManus |
| 3,527,007 A | 9/1970 | McManus |
| 3,600,868 A | 8/1971 | Wilson et al. |
| 3,624,980 A | 12/1971 | McManus |
| 3,683,580 A | 8/1972 | McManus |
| 3,728,835 A | 4/1973 | McManus |
| 3,902,350 A | 9/1975 | McManus |
| 3,979,868 A | 9/1976 | Butts et al. |
| 4,003,179 A | 1/1977 | Gilb |
| 4,056,908 A | 11/1977 | McManus |
| 4,189,883 A | 2/1980 | McManus |
| 4,259,822 A | 4/1981 | McManus |
| 4,285,173 A | 8/1981 | Grearson et al. |
| 4,295,310 A | 10/1981 | McManus |
| 4,333,280 A | 6/1982 | Morton |
| 4,432,178 A | 2/1984 | Taft |
| 4,454,695 A | 6/1984 | Person |
| 4,507,901 A | 4/1985 | Carroll |
| 4,527,372 A | 7/1985 | Ryan |
| 4,566,240 A | 1/1986 | Schilger |
| 4,592,184 A | 6/1986 | Person et al. |
| 4,593,507 A | 6/1986 | Hartman |
| 4,619,090 A | 10/1986 | McManus |
| 4,653,237 A | 3/1987 | Taft |
| 4,673,323 A * | 6/1987 | Russo .......................... 411/107 |
| 4,700,519 A | 10/1987 | Person et al. |
| 4,726,159 A | 2/1988 | Stohs |
| 4,802,786 A | 2/1989 | Yauger et al. |
| 4,845,908 A | 7/1989 | Stohs |
| 5,054,755 A | 10/1991 | Hawkes |
| 5,383,320 A | 1/1995 | Sorton |
| 5,544,464 A | 8/1996 | Dutil |
| 5,605,423 A * | 2/1997 | Janusz ....................... 411/387.6 |
| 5,657,596 A | 8/1997 | Powers |
| 5,755,542 A | 5/1998 | Janusz et al. |
| 5,761,873 A | 6/1998 | Slater |
| 5,836,131 A | 11/1998 | Viola et al. |
| 5,941,035 A * | 8/1999 | Purse .............................. 52/263 |
| 6,064,755 A | 5/2000 | Some |
| 6,230,467 B1 | 5/2001 | Leek |
| 6,357,191 B1 | 3/2002 | Ault et al. |
| 6,585,141 B2 | 7/2003 | Goss et al. |
| 6,622,569 B2 | 9/2003 | Mallick et al. |
| 6,668,510 B2 | 12/2003 | McManus |
| 6,698,148 B1 | 3/2004 | Manna et al. |
| 6,761,005 B1 | 7/2004 | Daudet et al. |
| 6,993,881 B1 | 2/2006 | Ruble et al. |
| 7,013,613 B1 | 3/2006 | Boellner et al. |
| 7,017,314 B2 | 3/2006 | Pace |
| 7,389,620 B1 | 6/2008 | McManus |
| 7,562,500 B2 | 7/2009 | Siu |
| 2003/0093961 A1 * | 5/2003 | Grossman ....................... 52/250 |
| 2006/0236815 A1 | 10/2006 | Beecherl et al. |

OTHER PUBLICATIONS

Mujagic et al., "Drilled Standoff Screws for Shear Connection in Light Composite Steel-Concrete Trusses"; Journal of Constructional Steel Research, vol. 63, No. 10, Oct. 2007, pp. 1404-1414.

Canadian Office Action for Application 2,650,688, dated Jul. 9, 2010.

Canadian Office Action issued in Canadian Patent Application No. 2,769,662 dated Apr. 10, 2012.

Canadian Office Action issued in Canadian Patent Application No. 2,650,688 dated Jan. 20, 2012.

* cited by examiner

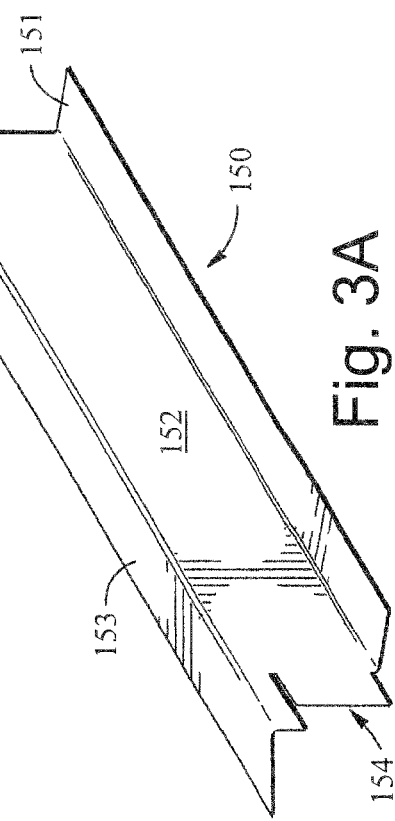
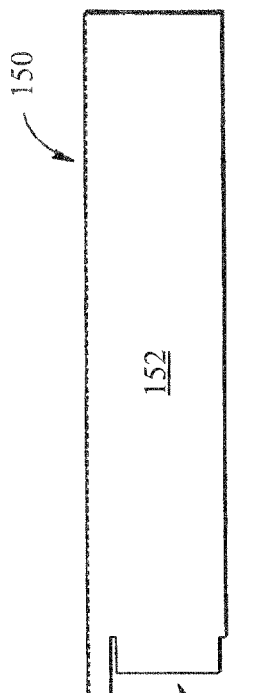
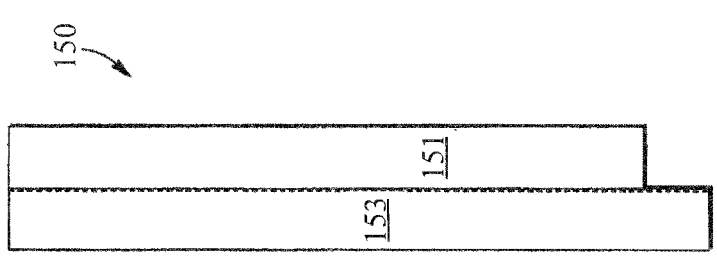
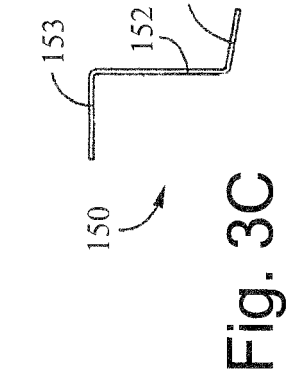
Fig. 3A
Fig. 3D
Fig. 3B
Fig. 3C

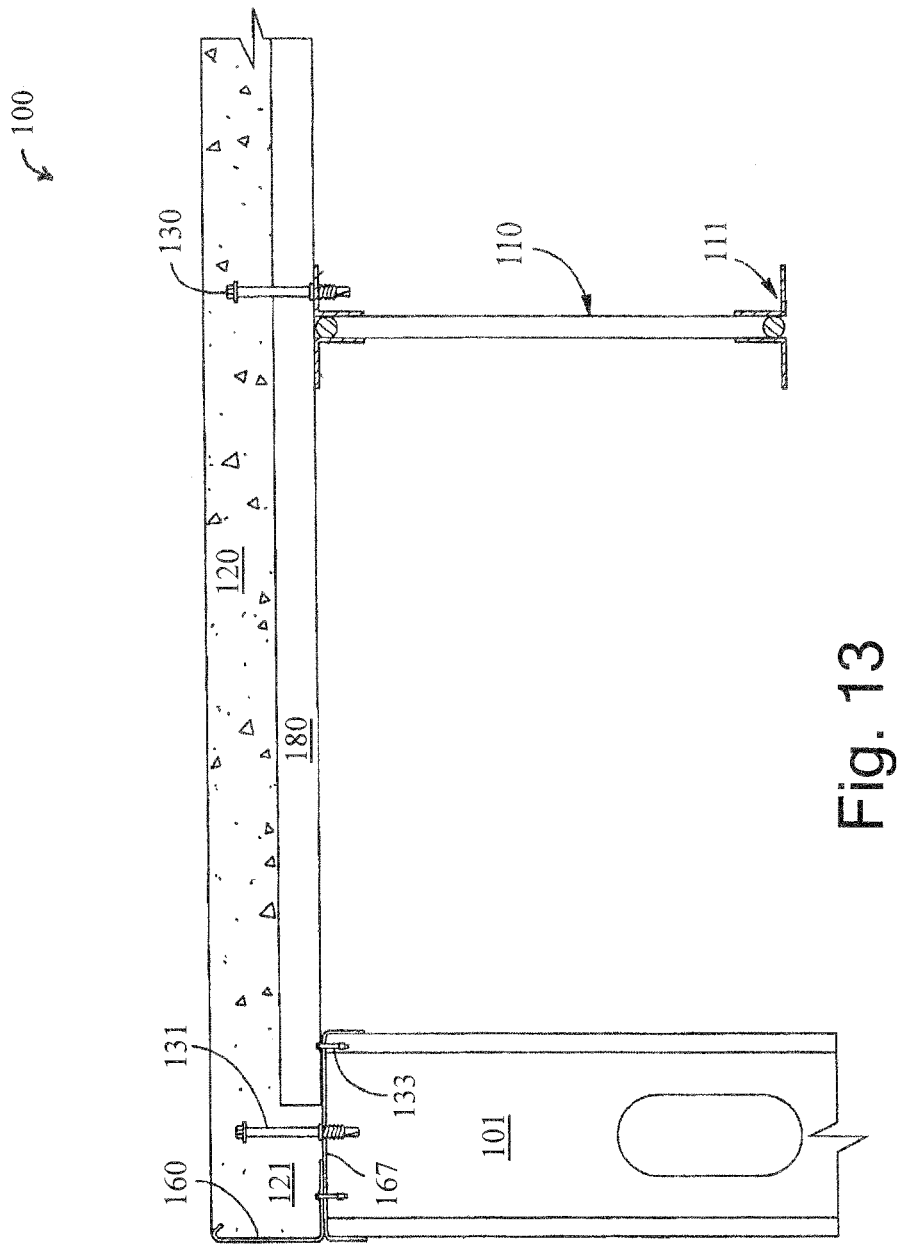

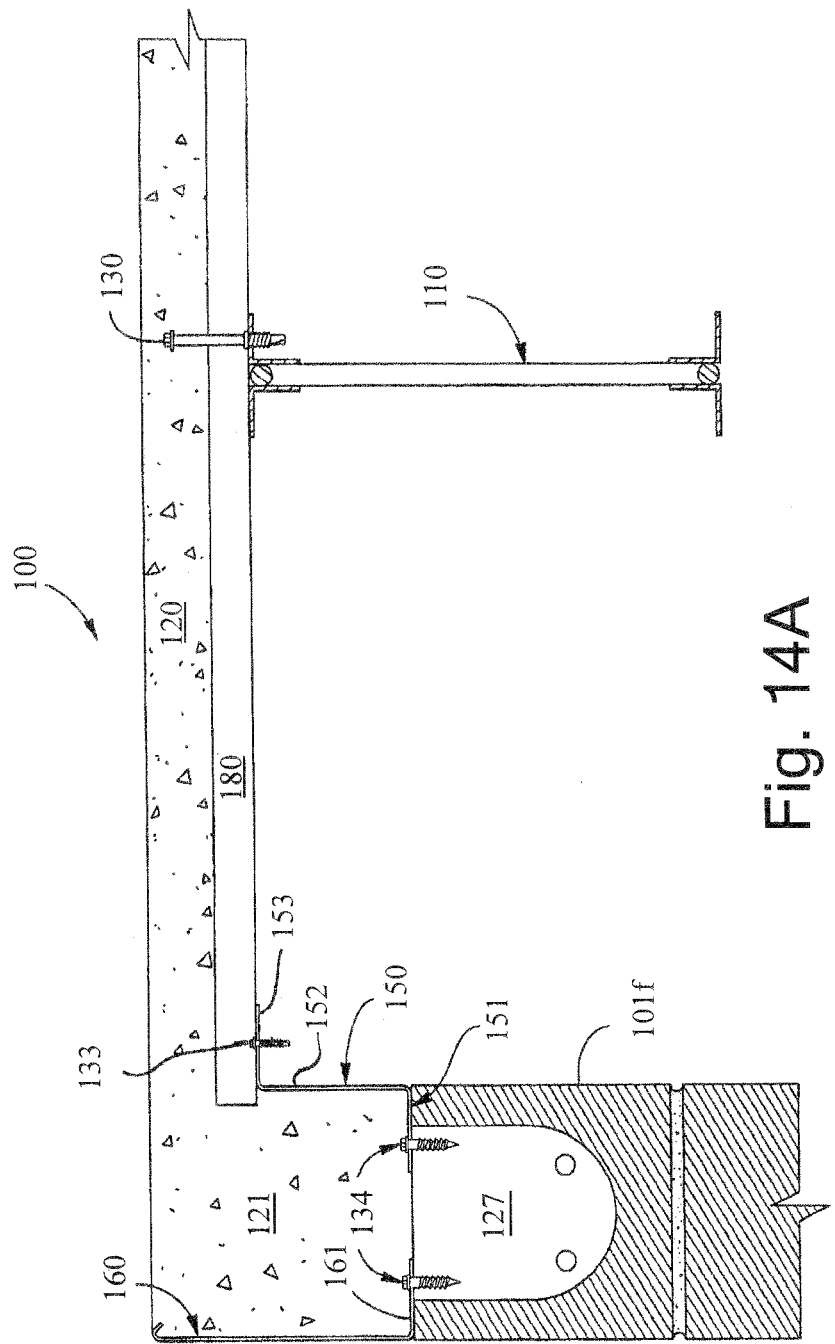

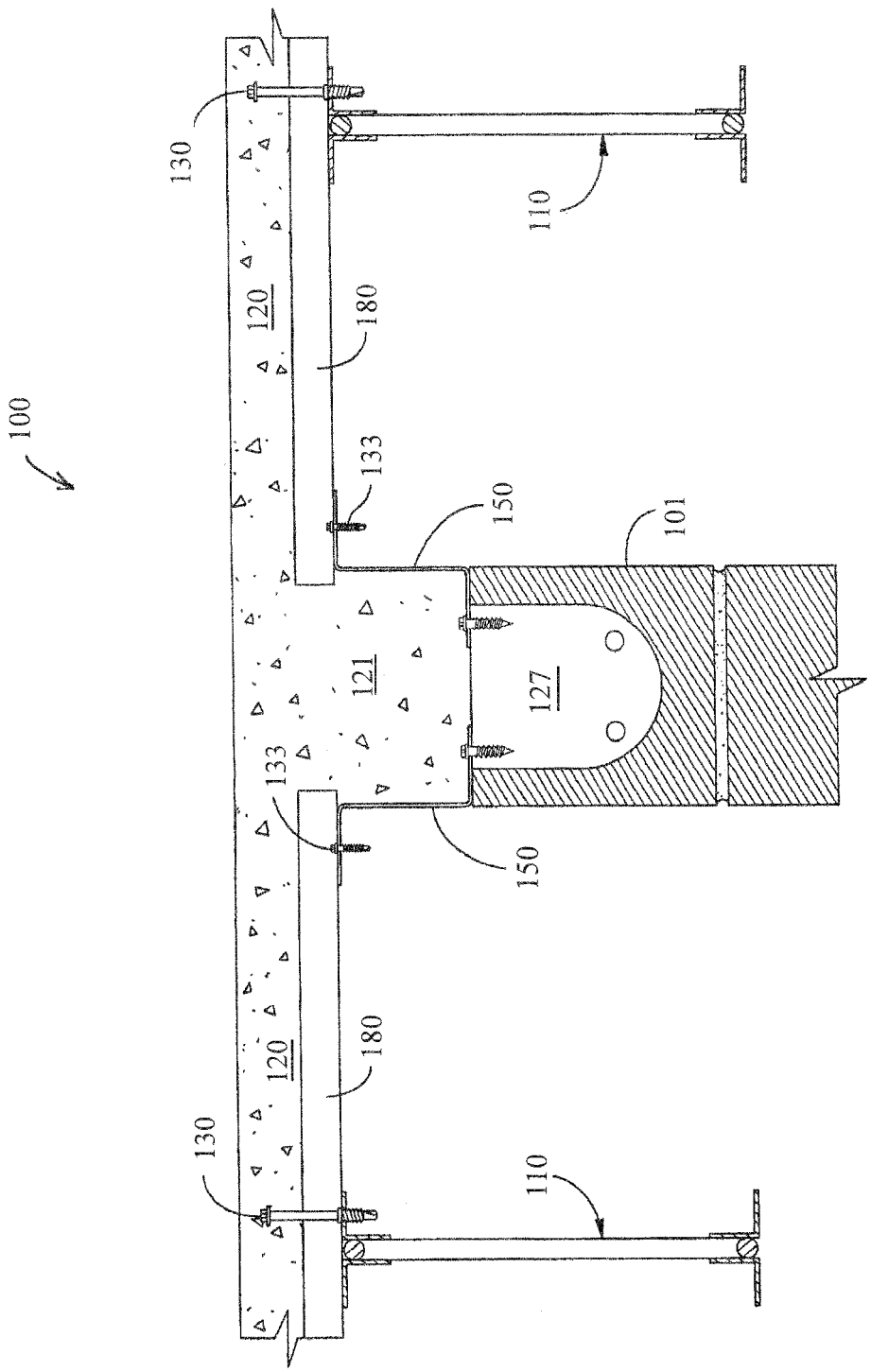

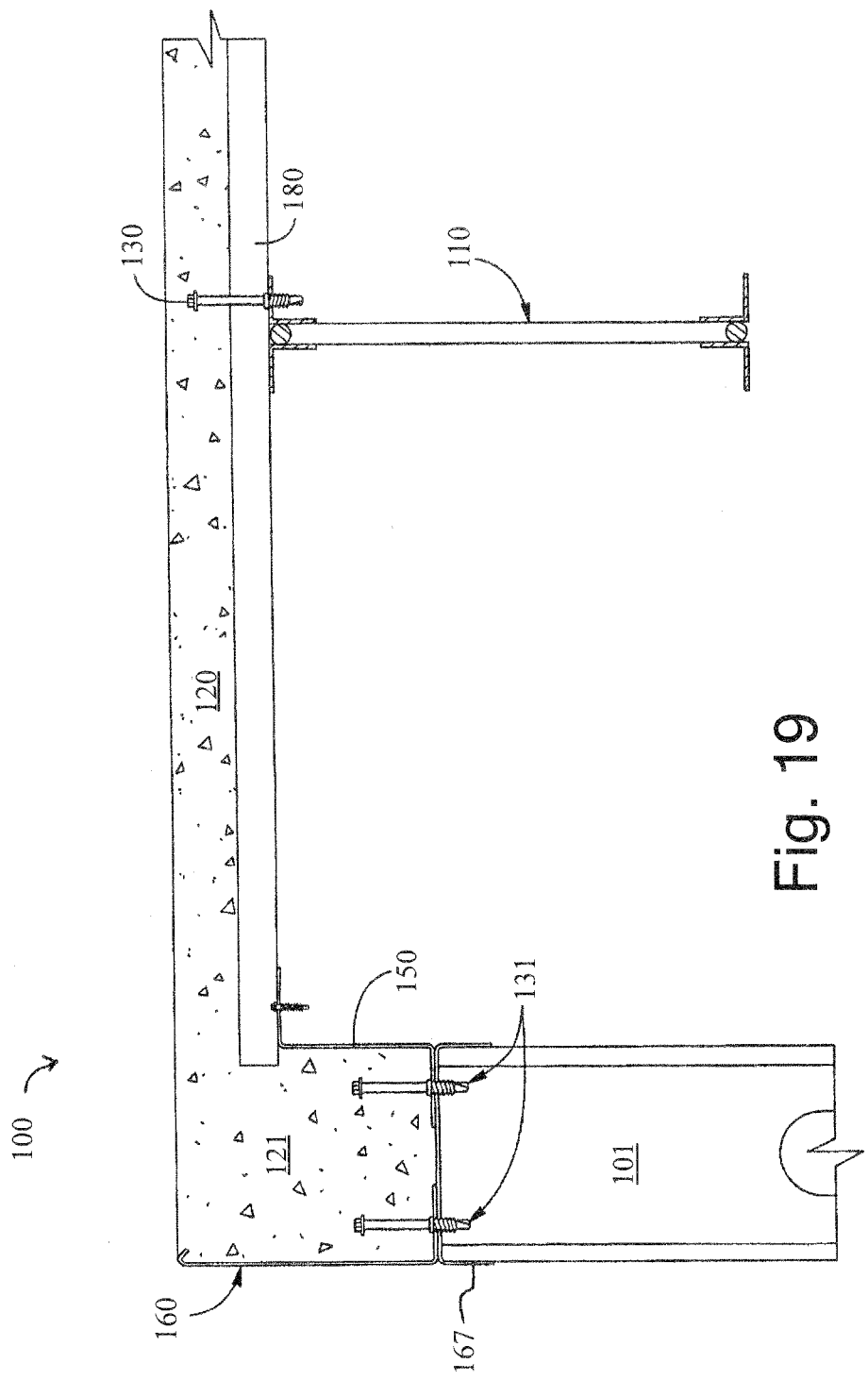

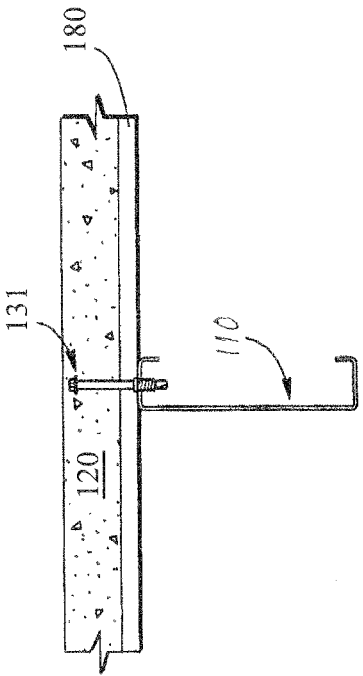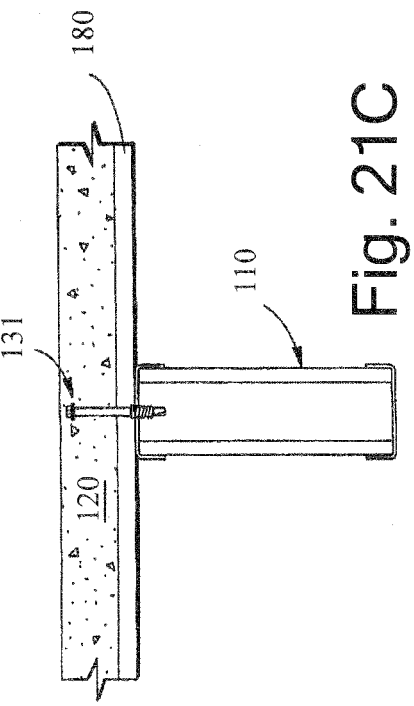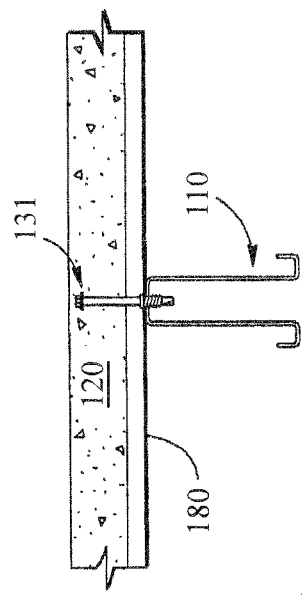

COMPOSITE JOIST FLOOR SYSTEM

RELATED APPLICATIONS

The application is a continuation-in-part of application Ser. No. 12/019,329, filed Jan. 24, 2008, and incorporated herein by reference.

BACKGROUND AND SUMMARY OF THE INVENTION

Large scale, multi-story buildings are typically constructed of steel and concrete. Floors in such buildings may be composite floor systems assembled by spanning wide flange beams with spaced-apart steel joists and installing typically corrugated metal decking over the joists. The decking forms a lateral surface onto which a cementitious slab can be placed and cured. Generally, the underside of the beams or lower chords of the joists form the framework from which ceilings may be supported. The composite floor construction is typically achieved by using welded shear studs, or partial extension of the joist upper chord, extending above the form or metal deck into the cementitious slab. Flooring system designs must also be mindful of fire safety, acoustics, and vibration considerations.

Such composite floor systems have been designed in the past to address one or more of these issues individually. These prior designs have included some systems that integrated the joist and deck assembly with the cementitious slab to provide a composite floor system. This integral structure was assembled by providing self-drilling studs with a threaded portion to be in threaded engagement with the deck and underlying joists. A length of each stud extended above the metal decking and was encased in the cementitious slab, and resisted and transmitted horizontal shear forces which develop between the cementitious slab and the supporting joist structure. See U.S. Pat. No. 5,605,423. These composite floor systems were an improvement, but still had drawbacks in that the floor systems were time consuming and difficult to install. There was still a need for a composite floor system that was rapidly and safely installed with fewer building errors to provide a floor system with improved erectability and economy for the same or greater load bearing capacity.

Disclosed is an improved composite joist floor system comprising a first support structure, a second support structure, a plurality of joists spaced apart and extending from the first support structure to the second support structure, decking supported by the plurality of joists, and a plurality of stand-off fasteners adapted to be fastened through the decking to the plurality of joists, each stand-off fastener of carbon steel comprising a lower portion and an upper portion where the lower portion has a clamping part capable of clamping the decking to the joist, the lower portion having a threaded portion adjacent the clamping part with a through hardness of between HRB 70 and HRC 40 and having the lower portion of the fastener with a failure torque to thread-forming torque of at least 3.0 and a drive torque at least 20% less than a thread-forming torque, a thread-forming portion adjacent the threaded portion of at least HRC 50 hardness adapted to enable the fastener to form threads in an upper chord of a joist, and a fluted lead portion adjacent the thread-forming portion of at least HRC 50 hardness with a nominal diameter between 80 and 95% of major diameter of the threaded portion adapted to form a fastener opening in an upper chord of a joist, and the upper portion of the stand-off fasteners have a through hardness of between HRB 70 and HRC 40 and when installed, at least a portion of the upper portion of each stand-off fastener extends significantly above the decking. The composite floor system is completed by providing a cementitious slab supported by the decking and encapsulating the upper portion of each stand-off fastener extending above the decking. The threaded portion of the fastener may extend to within 1.5 of a thread pitch of the clamping part of the fastener.

The threaded portion of each stand-off fastener may meet a specification selected from the group consisting of ASTM A307, ASTM A325, ASTM A354, and ASTM A490 specification or a specification selected from the group consisting of SAE J429 Grade 2, SAE J429 Grade 5, and SAE J429 Grade 8.

The stand-off fasteners of the composite joist floor system may have a drive torque no more than 50% of a thread-forming torque. In any case, the lower drive torque enables the fasteners to be rapidly installed through the deck and into a joist upper chord with low consumption by battery powered tools with a worker in a short time, with the thread forming torque in forming the threads in the deck and joist following drilling of the fastener opening and the seating torque desired for the fastener being the controlling torques in positioning the fastener. This low power consumption and labor saving installation is enabled by the nominal diameter fluted lead portion of the fastener adapted to form a fastener opening in an upper chord of a joist between 80 and 95% of major diameter of the threaded portion or between 80 and 98% of major diameter of the threaded portion. Additionally, the failure torque of the fastener is more than three (3) times the thread-forming torque and may be more than four (4) times the thread-forming torque so that the prospect of the fastener failing and lessening the load capability of the composite floor system is avoided. The thread-forming torque of each stand-off fastener may be no more than 100 inch-pounds.

The failure torque is substantially more than the seating torque of the fastener. The threaded portion of each stand-off fastener may have a seating torque of at least 80 inch-pounds, or between 80 and 450 inch-pounds to provide the proper seating torque, depending on the size of the stand-off fastener and type and properties of the decking, joist and other support material into which the stand-off fasteners are threaded. The threaded portion of each stand-off fastener may also have a thread angle of less than 50°, or may have a thread angle between 45 and 60° Alternately or in addition, the threaded portion may include back-tapered threads for ease of installation. The back-taper of the threaded portion may be between 0.0005 and 0.0025 inch per inch of length or between 0.001 and 0.003 inch per inch of length.

The thread-forming portion of each stand-off fastener may be between 3 and 7 thread pitches in length to provide desired thread-forming torque. To further improve the speed of assembly and improve the load carrying capacity of the composite floor the shape of the thread-forming portion of the stand-off fastener may be selected from the group consisting of bilobular, trilobular, quadlobular and pentalobular. Of these the quadlobular shape has been found to date to give the best performance in thread forming. In any event, these lobar shapes of the thread-forming portion of the fastener control the thread-forming torque and drive torque to facilitate assembly of the composite floor system and reduce failures in installation of the stand-off fasteners and improve the load carrying capacity of the assembled composite floor system.

In addition, the fluted lead portion of the stand-off fastener may have a milled point to reduce the failure rate of the stand-off fastener. Pinch point may be provided on the fluted lead portion of the stand-off fastener, but we have found the fasteners made with a milled point are more reliable and result in less failures of the stand-off fastener, reducing assembly time and cost and producing an assembled composite floor assembly with greater load capacity.

Another aspect of the present composite floor system is the threaded portion of the fastener has a through hardness of between HRB 70 and HRC 40, while the fluted lead portion and most if not all of the thread-forming portion has a hardness of at least HRC 50. Such through hardness on the threaded portion of the fastener enables the composite floor system to support higher loads as the fastener interacts with the cementitious slab and avoids cracking and fracturing of the fastener. The threaded portion of each stand-off fastener may be of at least HRC 33 through hardness and up to five threads adjacent the thread-forming portion may be hardened to at least HRC 50 hardness. To further facilitate assembly of the composite floor system, the fluted lead portion may be of at least HRC 54 hardness or of at least HRC 50 induction hardness. The upper portion of the stand-off fasteners have a through hardness of between HRB 70 and HRC 40 to provide ductility in the upper portion of the fastener to reduce cracking in the fasteners in operation in a cementitious slab of the composite joist floor system.

In addition, the clamping portion of the lower portion of each stand-off fastener of composite joist floor system may comprise a fastener drive head positioned to be used in installing the stand-off fastener and the upper portion of the stand-off fastener is sized to permit the stand-off fastener to be installed into the decking. A SEMS anchor or stake anchor may be positioned on the upper portion of the stand-off fastener sized to permit the stand-off fastener to be installed into the decking and a joist upper chord and the SEMS anchor or stake anchor engage in the cementitious slab on installing of the fastener and placement of the cementitious slab. Optionally, the stand-off fastener may include threads adjacent the end of upper portion of the fastener configured to couple to a reinforcing member such as rebar or some other member that will effectively extend the length of the stand-off fastener. These embodiments further improve the composite floor system by further reducing failures in positioning the fasteners, and at the same time reducing the time to assemble the floor system. Stand-off fasteners utilizing the SEMS anchor or stake anchor also are easy to produce and improve the load carrying capacity of the composite floor system at the same time.

The decking may comprise corrugated steel decking defining altering peaks and valleys, where the stand-off fasteners are installed in the valleys of the corrugated steel decking, and where adjacent stand-off fasteners along a joist are separated by at least one valley of the corrugated steel decking. Alternatively or in addition, the decking may comprise corrugated steel decking defining altering peaks and valleys, and at least two adjacent stand-off fasteners are located in the same valley of the corrugated steel decking.

Also disclosed is a wall panel system comprising a metal base adapted to support placement of a cementitious material, a plurality of stand-off fasteners for fastening at spaced locations along the base, each stand-off fastener of carbon steel comprising a lower portion and an upper portion where the lower portion has a threaded portion, a thread-forming portion adjacent the threaded portion adapted to enable the fastener to form threads in the base, and a fluted lead portion adjacent the thread-forming portion with a nominal diameter between 70 and 95% of major diameter of the threaded portion adapted to form a fastener opening in the base, and where, when installed, at least a portion of the upper portion of each stand-off fastener extends significantly above the base; and a cementitious slab formed on the base and encapsulating the upper portion of each stand-off fastener extending above the base to form a desired wall surface of the panel system.

The lower portion of the fasteners of wall panel system may have a threaded portion with a through hardness of between HRB 70 and HRC 40 and the lower portion of the fastener has failure torque to thread-forming torque of at least 3.0 and a drive torque at least 20% less than a thread-forming torque. The stand-off fastener may have a drive torque no more than 50% of a thread-forming torque. In addition, the thread-forming portion adjacent the threaded portion of a wall panel system has at least HRC 50 hardness adapted to enable the fastener to form threads in the base, and a fluted lead portion adjacent the thread-forming portion of at least HRC 50 hardness. The threaded portion of each stand-off fastener may be of at least HRC 33 through hardness and up to five threads adjacent the thread-forming portion may be hardened to at least HRC 50 hardness. The fluted lead portion may have at least HRC 54 hardness. The upper portion of the stand-off fasteners have a through hardness of between HRB 70 and HRC 40 to provide ductility in the upper portion of the fastener to reduce cracking in the fasteners in operation in a cementitious slab of the wall panel system.

These wall panel systems are typically assembled with the lower portion of the stand-off fasteners drilled and threaded into the metal base. The base may comprise corrugated metal decking assembled and fastened to wall studs. In any case, temporary or permanent side walls may surround the metal base and support the concrete during placing and curing of the cementitious slab. The wall may extend above the upper portion of the stand-off fasteners so the surface of the cementitious slab provides a desired wall surface for the panel system without upper portions of the fasteners showing through. In this way a composite wall panel can be assembled that can be lifted into place. The wall panel system has the metal base, cementitious slab and stand-off fasteners as an integral wall system that can provide a desired wall surface where cracking of the cementitious slab is inhibited if not eliminated. The wall panel system may be used either as an inside wall system or an outside wall system as explained in more detail below with reference to the drawings.

To facilitate assembly and avoid assembly defects, the clamping portion of the lower portion of each stand-off fastener may comprise a fastener drive head positioned to be used in installing the stand-off fastener, with the upper portion of the stand-off fastener sized to permit the stand-off fastener to be installed into the base. An SEMS anchor or stake anchor may be positioned on the upper portion of the stand-off fastener sized to permit the stand-off fastener to be fastened into the base, with the SEMS anchor or stake anchor (threaded or unthreaded) engaging in the cementitious slab on installing of the fastener and placement of the cementitious slab. These embodiments provide for easier installation, while improving the quality and integrity of composite wall panel system assembled.

Alternatively, a fastener drive head may be positioned on the upper portion of each stand-off fastener adapted to be used in fastening the stand-off fastener to the base and to engage in the cementitious slab on installing of the fastener and placement of the cementitious slab. In this embodiment, SEMS anchor is part of the lower portion of each stand-off fastener and adapted to engage the base and the cementitious slab on placement of the cementitious slab.

To facilitate assembly of the wall panels, the thread-forming portion of each stand-off fastener has a shape selected from the group consisting of bilobular, trilobular, quadlobular and pentalobular.

For the wall panel systems, the threaded portion of each stand-off fastener may meet a specification selected from the group consisting of ASTM A307, ASTM A325, ASTM A354, and ASTM A490 specification or a specification selected from the group consisting of SAE J429 Grade 2, SAE J429 Grade 5, and SAE J429 Grade 8.

As with the composite floor systems, the fluted lead portion of the stand-off fastener may have a milled point to reduce the failure rate of the stand-off fastener. Pinch point may be provided on the fluted lead portion of the stand-off fastener, but as previously observed, we have found the fasteners made with a milled point are more reliable and result in less failures of the stand-off fastener, reducing assembly time and cost and producing an assembled composite floor assembly with greater load capacity

BRIEF DESCRIPTION OF THE DRAWINGS

Having described embodiments of the invention in general terms, reference will now be made to the accompanying drawings, which are not necessarily drawn to scale, where additional features and advantages of the disclosed inventions are presented and described in more detail:

FIGS. 3A, 3B, 3C and 3D illustrate views from different perspectives of a portion of a z-shaped closure illustrated in FIGS. 1 and 2 in accordance with an embodiment of the present invention;

FIG. 13 illustrates a partial cross-sectional side view of a composite joist floor system showing corrugated steel decking supported by a floor joist and at its edge by a stud wall substantially parallel to the joists and generally perpendicular to the corrugations in the metal decking, in accordance with an embodiment of the present invention;

FIG. 14A illustrates a partial cross-sectional side view of a composite joist floor system supported by a floor joist and an exterior wall substantially parallel to the joists supports and generally perpendicular to corrugated steel decking using a z-shaped closure, in accordance with an embodiment of the present invention;

FIG. 14B illustrates a partial cross-sectional side view of a composite joist floor system supported by floor joists and an interior supporting wall that is substantially parallel to the joists and supports the edges of two corrugated steel decking sheets using z-shaped closures, in accordance with an embodiment of the present invention;

FIG. 19 illustrates a partial cross-sectional view of a composite floor system with a floor joist and adjacent external support wall substantially parallel to the floor joists where stand-off fasteners through the metal decking into the joist and into the wall transfer diaphragm forces, in accordance with an embodiment of the present invention;

FIGS. 21A, 21B and 21C illustrate partial cross-sectional views of three different exemplary cold-formed steel floor joists that can be used in the present composite joist floor system, in accordance with embodiments of the present invention;

DETAILED DESCRIPTION OF THE DRAWINGS

Embodiments of the present invention now will be described more fully hereinafter with reference to the accompanying drawings, in which some, but not all, embodiments of the invention are shown. The invention may be embodied in many different forms and should not be construed as limited to the embodiments set forth herein.

Composite Joist Floor Systems

The composite joist floor systems described herein are generally assembled at the building site and provide structural support for floors and/or ceilings of the building. In general, pluralities of steel joists are positioned laterally spaced apart supported at either end by the building's primary support structures. Such building support structures may include but are not limited to: I-beams and H-beams, joist girders, masonry walls, concrete walls, cold-formed wall studs, and/or wood load bearing wall studs. In any case, the steel joists span the open areas within the building's main structure to provide support for the floors or ceilings, or both. Importantly, the present invention provides a plurality of varying component floor system designs and design approaches. These various designs may use a combination of joist depth, chord size, joist spacing, flexible stand-off fastener size and spacing, and various corrugated steel deck profiles to create flooring systems that are light in weight, have generally decreased material costs, labor costs, and construction costs, assembled largely without construction errors, and offer improved strength and load bearing capacity.

Typical steel joists of the composite joist floor systems described herein have spans ranging from eight (8) to fifty (50) feet and depths ranging from eight (8) to fifty (50) inches. In addition to variations in the size and spacing of the joist, the number and pattern of the stand-off fasteners, the configuration of the corrugated steel decking, the connections between the flooring system and the support beam, as well as other design elements contribute to lighter weight, materially reduced construction errors, and added strength and load bearing capacity for the composite floor system.

Figure 1:
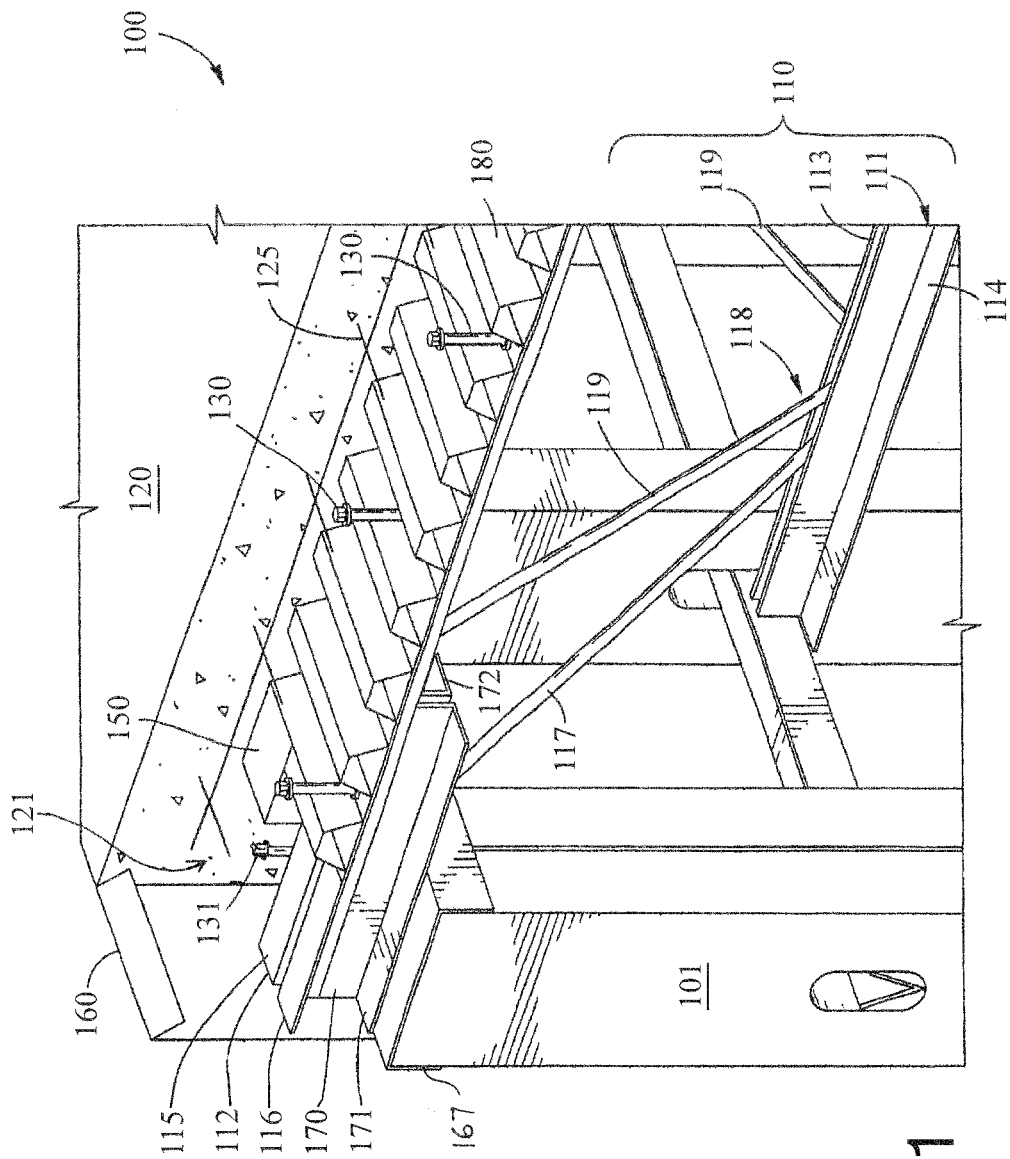
FIG. 1 illustrates a partial perspective view, with portion broken away, of a composite floor system in accordance with an embodiment of the present invention.
Figure 2:
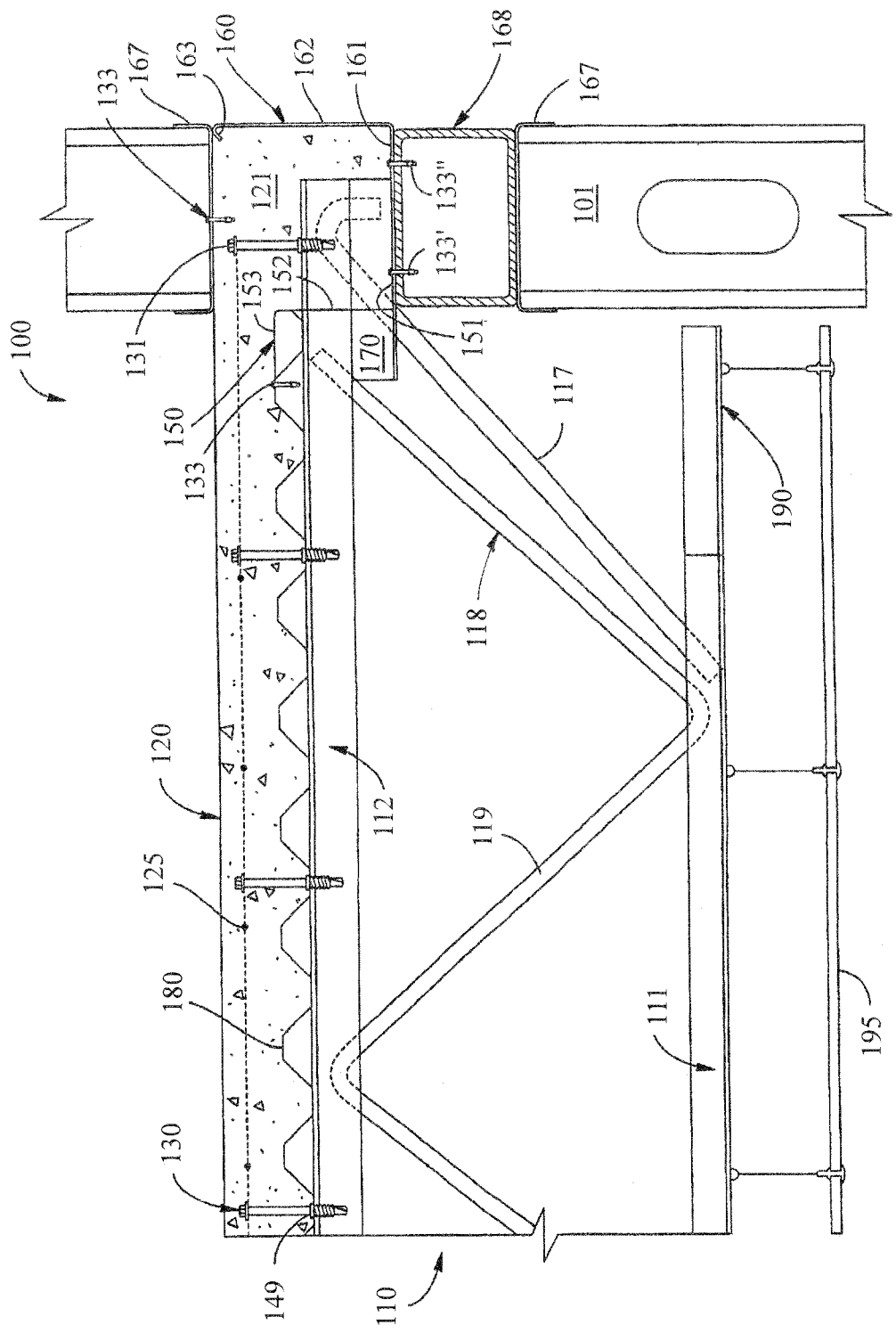
FIGS. 2, 2A and 2B illustrate partial cross-sectional side views of three composite floor systems similar to the floor system illustrated in FIG. 1, in accordance with embodiments of the present invention.

Referring to the drawings, FIGS. 1 and 2 illustrate a partial perspective view, with portions broken-away, and a partial cross-sectional side view, respectively, of a composite joist floor system 100 in accordance with an embodiment of the present invention. As illustrated in FIGS. 1 and 2, and as described above, the composite joist floor system 100 generally includes a plurality of laterally, spaced apart joists 110 supported on their ends by a supporting wall or beam, such as a wall structure 101 comprising steel wall studs as shown in FIGS. 1 and 2. The joist 110, in combination with other joists, walls, or beams (not shown); supports a cementitious slab 120 on corrugated steel decking 180. The corrugated steel decking 180 is typically, but not necessarily positioned such that the corrugations run substantially perpendicular to the joist 110. Importantly, a plurality of stand-off fasteners 130 are drilled through the corrugated steel decking 180 into the upper chord of joist 110. The lower portion of each stand-off fastener 130 connects the corrugated decking 180 to the joist 110, and the upper portion of each stand-off fastener 130 extends some distance above the corrugated decking 180. In this way, when cementitious material is placed over the corrugated steel decking 180, the stand-off fasteners 130 are encapsulated within the cementitious slab to form a composite joist floor system, once the concrete is cured. As will be described in greater detail below, this composite joist floor system allows for structures that can be assembled substantially error-free at much lower cost and to be stronger, lighter, and/or safer composite floor system. The term "concrete" here can be any of a number of cementitious materials or materials with properties similar to cementitious materials as may be accepted by governing building codes and/or desired in the particular embodiment.

As illustrated in FIGS. 1 and 2, in an exemplary embodiment, each joist 110 comprises an upper chord 112 and a lower chord 111. The upper chord 112 and the lower chord 111 are joined together by a web 118 extending there between. In the illustrated embodiment, the web 118 has an open web configuration comprising one or more of rod, angle, or cold-formed "C" shaped members 119 that extend between and are coupled to the upper chord 112 and the lower chord 111. In the illustrated embodiment of the invention, the web 118 is made primarily from a single round solid rod 119 bent into a zigzag or sinusoidal-like pattern having one or more peaks alternating with valleys. In such an embodiment, the upper chord 112 is welded (or otherwise coupled) to the peaks in the bent rod 119 and the lower chord 111 is welded (or otherwise coupled) to the valleys in the bent rod 119. These rods 119 may be of a low carbon steel composition which is generally used for rebar in reinforcing concrete.

In the illustrated embodiment, the upper chords 112 and lower chords 111 may be each formed from two L-shaped metal members positioned back-to-back (also sometimes referred to as "angle irons," although the angle members described generally are steel and not iron). FIG. 1 illustrates an embodiment where two angles 113 and 114 are placed on either side of the bent rod 119 forming the open web, and joined to the valleys in the bent rod 119 to form the lower chord 111. Similarly, two angles 115 and 116 are placed on either side of the bent rod 119 and joined to the peaks in the bent rod 119 to form the upper chord 112. The webs 118 are shown herein as bent rod 119, but can be almost any cross-sectional shape. So that the composite joist floor system 100 is relatively light in weight, the L-shaped members forming the upper chord 112 and the lower chord 111 typically have relatively thin cross sections.

As further illustrated in FIGS. 1 and 2, the joist 110 includes a rod-shaped "end diagonal" 117 at each end of the joist for transferring forces between the joist 110 and the supporting wall structure 101. The "end diagonal" 117 may be L-shaped angles or cold-formed "C"-shaped sections suitable for heavier floor loadings. One end of the end diagonal 117 is joined to the lower chord 111 at or near a nearest joint of the web and the other end of diagonal 117 joined to the upper chord 112 at or near to the seat or joist shoe 170. In some embodiments, the lower chord 111 of the joist 110 may include a ceiling extension 190 that extends the lower chord 111 such that the lower chord 111 ends proximate the wall structure 101 or beam if desired. Such an extension 190 may be provided as support for a ceiling 195 hung from the lower chord 111.

As described above, corrugated steel decking 180 is positioned over the joist 110 and with each decking section generally spanning two or more adjacent joists. The corrugated steel decking 180 may be painted, galvanized or otherwise coated as desired. Standard corrugated steel decking generally comes in the form of sheet sections in widths of 32, 33, or 36 inches. Besides coming in a variety of widths, standardized corrugated steel decking sections also comes in a number of different profiles and thicknesses, depending on the application. The type of corrugated steel decking primarily illustrated herein is 1.0 inch deep steel decking, although other types of decking may be used depending upon the application. The steel used in the steel decking and joist may be made by electric arc furnace from generally 70% recycled materials.

As illustrated in FIGS. 1 and 2, the corrugated steel decking 180 is generally positioned such that the corrugations run laterally to the joist 110 span. As described in detail below with reference to FIGS. 4A, 4B and 4C, stand-off fasteners 130 are such to provide rapid and safe assembly of the composite joist floor system that is more potentially error-free and can support large loads. Stand-off fasteners 130 are drilled through the corrugated decking 180 and the flanges of the upper chord 112, with the upper portion of the stand-off fasteners encapsulated in the concrete. The stand-off fasteners 130 transfer horizontal shear forces between the cementitious slab 120 and the joist upper chord of the joist 110 allowing the two structures to act more like a single unit. The composite structure may be significantly stronger and/or material and labor may be reduced in the floor system over non-composite systems. The cementitious floor slab 120 is designed with sufficient cementitious materials to provide the load bearing capacity of the composite floor system.

In some embodiments, the cementitious slab 120 is strengthened by placing reinforcing such as welded wire fabric 125 or other types of reinforcing over the corrugated steel decking 180. When the cementitious slab 120 is placed over the corrugated steel decking 180, the welded wire fabric 125 and the upper portion of the stand-off fasteners 130 are encapsulated within the cementitious slab 120. The concrete is then smoothed so as to form a floor of the building. In some embodiments, ties or lifts are used to hold the welded wire fabric 125 in desired location above the corrugated steel decking 180 as the cementitious slab 120 is placed.

The composite joist floor system 100 described above provides many advantages over the traditional non-composite and composite floor systems. In non-composite floor systems, the joist and the cementitious slab share load based on the relative stiffness of each component and act substantially independently to support the bearing loads on the composite joist floor system. In previous composite joist floor systems, the steel joist, metal decking, and cementitious slab act as a composite and the system is relatively thin compared to its span (i.e., the length of the joist) where ease of installation and potential errors in the installation are a focus. Such composite joist floor system required additional large labor costs and requires anticipating potential broken and defectively installed stand-off fasteners. As such, prior composite joist floor systems were designed with more or heavier components to provide the same safety factors as needed for error-free assembly and installation of the composite floor systems. In contrast, the composite joist floor system described herein can be assembled and installed with low labor costs while reducing potential errors in installation. These factors, and because the stand-off fastener can be more effective to produce a composite floor system with high load bearing capacity, the overall cost of the composite joist floor system can be reduced and at the same time safer composite joist floor systems capable of higher load bearing capacity can be produced.

To explain, the cementitious slab 120 carries compression and the lower chord 111 of the joist 110 carries tension. As such, the design moment is based on the concrete strength, the steel strength, and the shear transfer between them. The stand-off fasteners 130 function as a shear transfer mechanism in the composite joist floor system and are the focus in the operation of the overall composite floor system. In this way, the material used in the structure can be reduced to reduce weight and costs depending on the effectiveness of the stand-off fasteners. Alternatively, the size and strength of the upper chord 112 can be reduced and transitioned to increase the size and strength of the lower chord 111 to achieve significant increases in load capacity without an increase in the amount of material in the joist. Therefore, in some embodiments of the present invention, the upper chord 112 of the joist 110 is smaller than the lower chord 111 or is formed from lower strength material compared to the material used to form the lower chord 111.

Returning to FIGS. 1 and 2, as described above the end of the joist 110 is supported by a beam, a wall, or other structural support member. In the illustrated example, the end of the joist 110 is supported by the wall structure 101 comprising cold formed steel wall studs. The end of the upper chord 112 has a shoe 170 for transferring forces from the joist 110 to the wall 101. In the illustrated embodiment, the shoe 170 is made up of a pair of metal L-shaped angles positioned back-to-back and welded beneath the upper chord angles 115 and 116. Configured as such, the angles 115 and 116 that make up the upper chord 112 and the angles 115 and 116 that make up the joist shoe 170 combine to form an I-beam like bearing connection. The end of the end diagonal 117 is positioned between the shoe angles 171 and 172 and serves as a spacer between the shoe angles. In this regard, the shoe angles 171 and 172 are welded to the end diagonal 117 in addition to being welded to the upper chord angles 115 and 116.

Figure 2A:
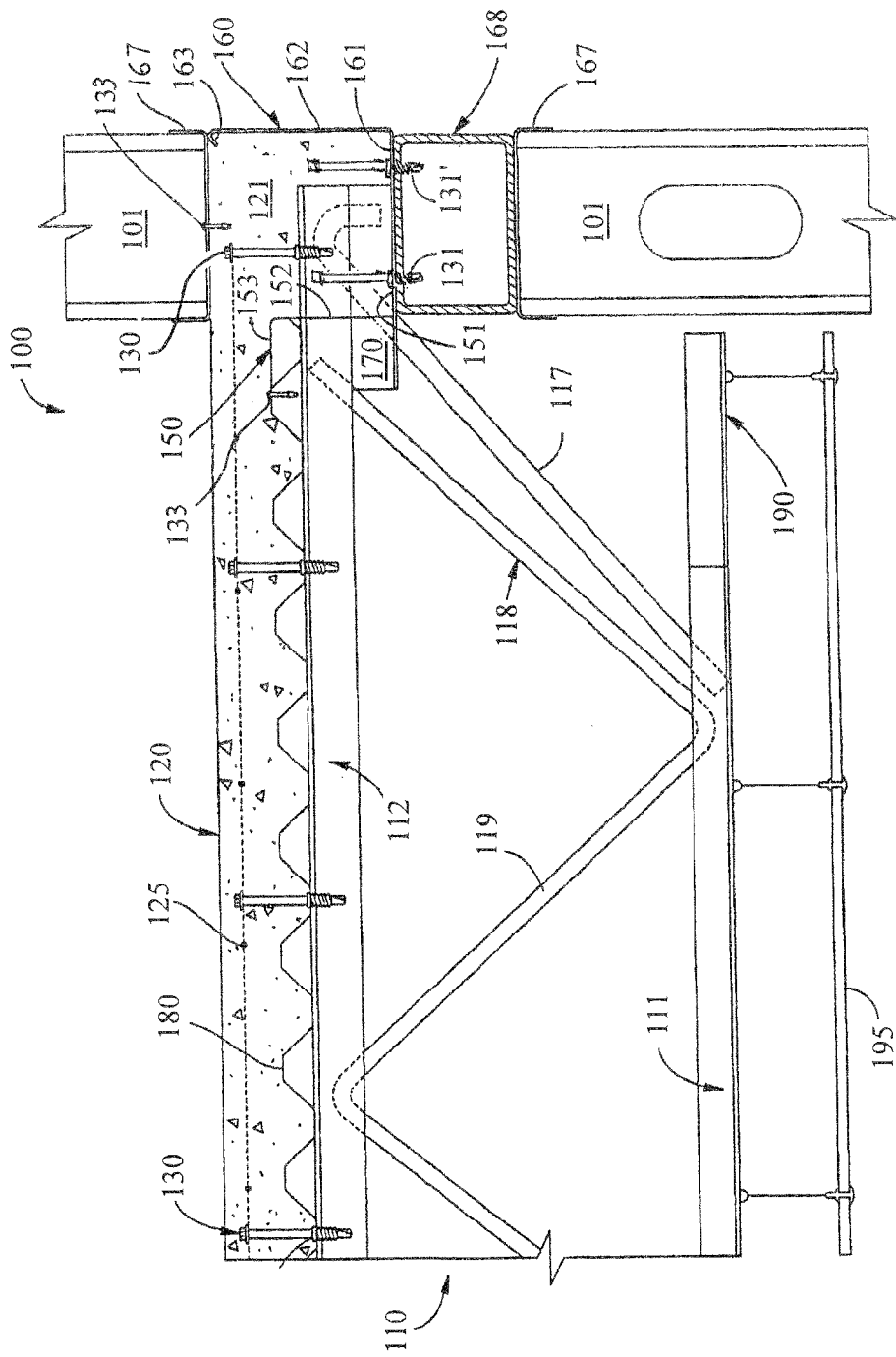
Figure 2B:
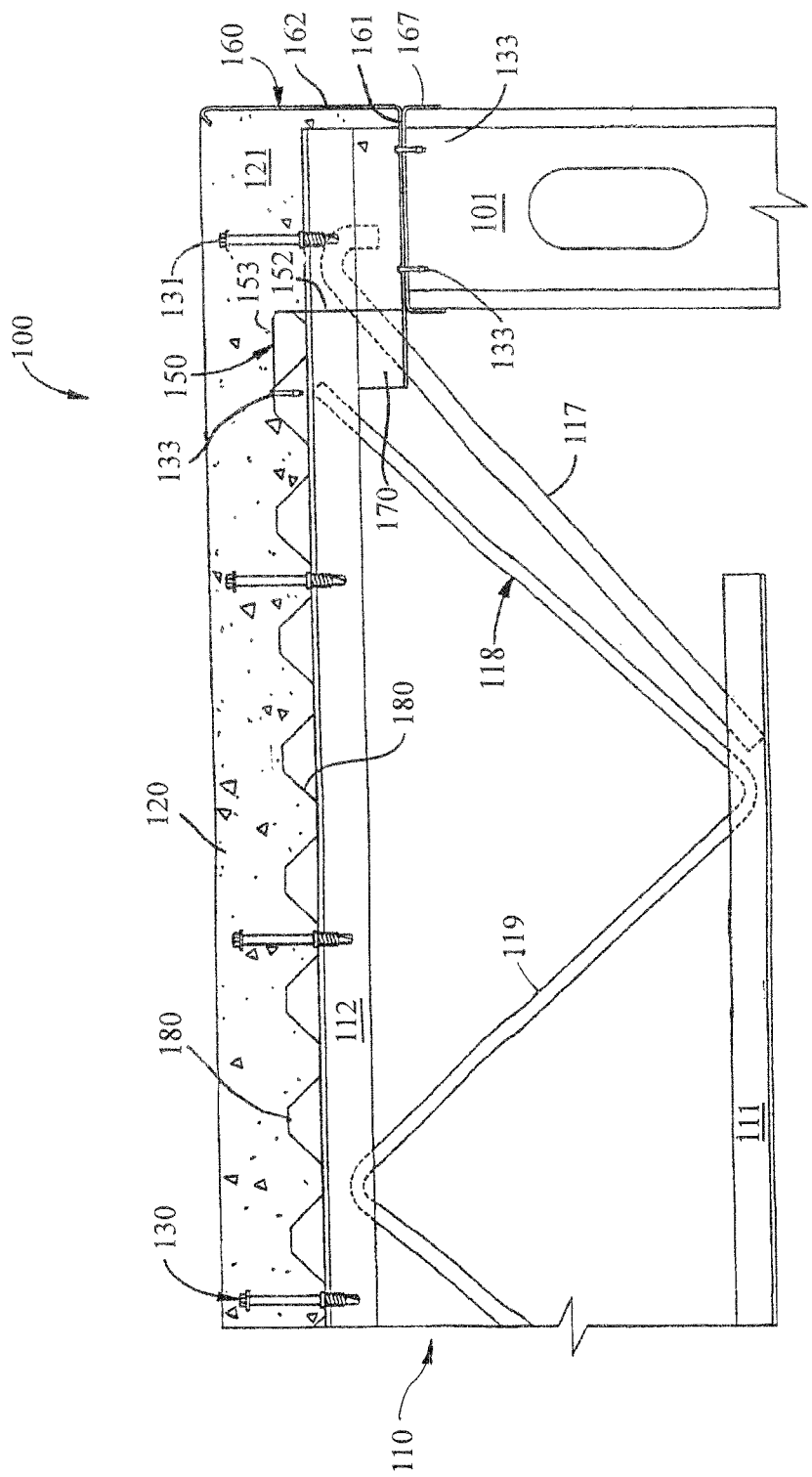

The lower surface of the joist shoe 170 rests upon and is supported by the wall structure 101. As illustrated in FIG. 2A, a load distribution member 168 or header and/or a wall track 167 or plate may be positioned between the wall studs and the joist shoe 170 to distribute force along the length of the wall 101. In other embodiments, as illustrated in FIGS. 1 and 2B, a distribution member 168 may not be used.

As further illustrated in FIGS. 1 and 2, in some embodiments of the composite joist floor system 100, the corrugated steel decking 180 does not extend significantly over the wall structure 101 or other supporting member. In this way, when the cementitious slab 120 is placed over the steel decking 180, the concrete may flow into the region above the supporting wall 101 and forms cementitious composite beam 121 with encapsulated stand-off fastener 131 in the wall structure that is integral with the cementitious slab 120. The concrete in the region 121 also encapsulates the ends of the upper chords 112 of each joist 110 and the ends of each joist shoe 170, and functions to assist the load transfer of the joist shoes 170 to the upper portion of the wall structure 101. The concrete in the region forms a cementitious beam 121 extending over the wall structure 101 lateral to the joists 110. This cementitious beam helps to collect and distribute forces being transferred between the walls and the floor so there is no need for an additional load distribution element such as load distribution member 168. As illustrated in FIGS. 1 and 2, a z-shaped closure 150 and a pour stop 160 are used to contain the concrete within the region 121 over the upper portion of the wall structure 101. The composite joist floor system 100 with the integral cementitious beam 121 in the upper portion of the wall structure 101 as illustrated in FIGS. 1 and 2 may lead to improved fire-safety ratings, improved acoustic attenuation, and most importantly, a stronger and more economical overall building structure.

In the embodiment illustrated in FIG. 2A, a pour stop 160 is used to prevent the cementitious slab 120 from flowing beyond the plane of the supporting wall 101 as the cementitious slab 120 is being placed and cured. The pour stop 160 has a lower lateral flange 161 and an upwardly extending face 162. The lateral flange 161 rests on a tubular distribution member 168 and optionally may be coupled to the distribution member 168 by, for example, a stand-off fastener 131. The pour stop 160 is positioned such that the upwardly extending face 162 is substantially within the same plane of the backside of the wall structure 101 so that the upwardly extending face 162 of the pour stop 160 prevents the concrete from flowing beyond this plane into the building exterior. The pour stop 160 may have an upper lip 163 in the upwardly extending face 162 that curves or is otherwise bent inward and downward toward the joist 110. The lip 163 prevents the upwardly extending face 162 of the pour stop 160 from becoming separated from the cementitious slab 120 and, therefore, prevents moisture from entering between the pour stop upwardly extending face 162 and the cementitious slab 120. Alternatively in some embodiments, the pour stop 160 may not include the lip 163. In one exemplary embodiment, the height of the pour stop 160 is sized such that a 2.5 to 3-inch deep 3000 pounds per square inch minimum compressive strength cast-in place cementitious slab 120 is created over the corrugated steel decking 180.

Opposite the pour stop 160, a z-shaped closure 150 is provided. In combination with the joist 110 and the corrugated steel decking 180, the z-shaped closure 150 functions to contain the concrete within the region 121 above the wall structure 101. FIGS. 3A, 3B, 3C and 3D illustrate a portion of a z-shaped closure 150 in accordance with an embodiment of the present invention. As illustrated in FIG. 3, the z-shaped closure 150 has a generally upwardly extending face 152, with upper flange 153 extending away from the wall structure 101, and a generally lateral lower flange 151 extending in a direction opposite from the upper flange 153. In the illustrated embodiment, the upwardly extending face 152 has a cutout 154 at one end. The cutout 154 has the shape of approximately one-half of an I-beam. This cutout 154 is configured to fit around at least one side of the I-beam formed by the combination of the upper chord 112 and the joist shoe 170, as illustrated in FIGS. 1 and 2. As also illustrated in FIGS. 1 and 2, the upwardly extending face 152 of the z-shaped closure extends upwards above the upper chord 112 so that the upper flange 153 extends above a peak or peaks in the corrugated steel decking 180. Stand-off fasteners 131, welds, pneumatic pins, or a variety of other fasteners may be used to couple the lower flange 151 to the supporting wall. Fasteners 133, welds, pneumatic pins, or a variety of other fasteners may be used to couple and the upper flange 153 to a peak or peaks in the corrugated steel decking 180.

As illustrated in FIG. 3C, in some embodiments of the invention, the lower flange 151 is configured such that, before the z-shaped closure 150 is installed in the composite floor system 100, the lower flange 151 may have an angle with the upwardly extending face 152 that is greater or lesser than 90 degrees with a tapered or forward angle to provide a desired set for the z-shaped member when installed. For example, the z-shaped closure illustrated in FIG. 3C forms a 100-degree angle between the upwardly extending face 152 and the lower flange 151. When such a z-shaped closure 150 is installed in the floor system 100, the z-shaped closure 150 may be pressed into position such that the angle between the upwardly extending face 152 and the lower flange 151 is reduced to an angle closer to 90 degrees. When the z-shaped closure 150 is installed in this manner, the resilient bias of the z-shaped closure 150 will press the lower flange 151 against the upper portion of the wall structure 101 and, thereby, create a better seal between the wall structure 101 and the z-shaped closure 150 than would have otherwise been formed using a z-shaped closure manufactured to have a 90-degree angle or other desired angle between the upwardly extending face 152 and the lower flange 151. Alternatively, where space on the upper portion of the supporting wall is limited, the lower flange 151 may be shortened as desired for the application and fasteners used to attach the z-shaped closure to the supporting wall.

Figures 4A, 4B, 4C:
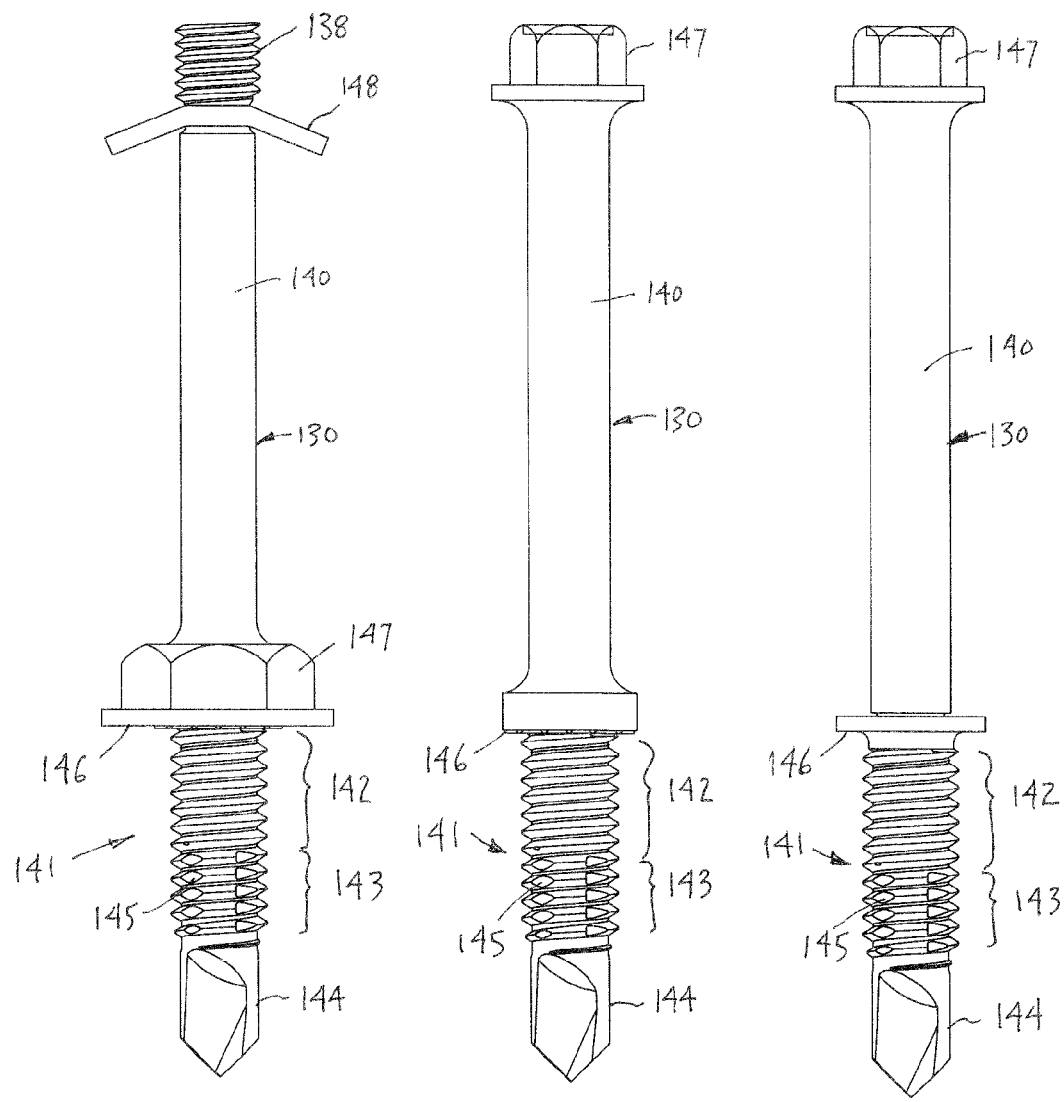
FIG. 4A illustrates a side view of a stand-off fastener illustrated in FIGS. 1 and 2 in accordance with an embodiment of the present invention.
FIG. 4B illustrates a side view of an alternative stand-off fastener illustrated in FIGS. 1 and 2 in accordance with an embodiment of the present invention.
FIG. 4C illustrates a side view of an alternative stand-off fastener illustrated in FIGS. 1 and 2 in accordance with an embodiment of the present invention.

The stand-off fasteners 130 of carbon steel as shown in FIGS. 4A through 4E have the upper portion 140 having a desired length and the lower portion 141, where the lower portion has a clamping part 146 capable of clamping the decking 180 to the joists 110. As shown in FIG. 4A, a fastener head 147 may be part of the clamping part 146, or be a separate head 147 that is part of upper portion 140 as shown in FIGS. 4B and 4C. In any case, the fastener head of each stand-off fastener is adapted to be used in installing the stand-off fastener 130 and to engage in the cementitious slab 120 on installing of the fastener and placing the cementitious slab.

The lower portion 141 of the fastener 130 includes a threaded portion 142 adjacent the clamping part 146 having a hardness between about Rockwell B-Scale hardness (HRB) 70 and Rockwell C-Scale hardness (HRC) 40 through hardness, and includes a thread-forming portion 143 adjacent the threaded portion 142 of at least HRC 50 hardness adapted to enable the fastener to engage with formed threads in decking 180 and joist upper chords 112. The lower portion 141 of the stand-off fasteners 130 may include a self-drilling end portion comprising the fluted lead portion 144 adjacent the thread-forming portion 143 of at least HRC 50 hardness with a nominal diameter between about 80 and 98% of the major diameter of the threaded portion 142 adapted to form a fastener opening. The fluted lead portion 144 drills through the decking 180 and flange of the upper chord of joists 110 during installation, and the thread-forming portion 143 forms threads in the bore of the drilled fastener opening for the threaded portion 142 to engage the decking 180 and the upper chord of joists 110. The stand-off fastener 130 is seated by clamping part 146 to clamp with the threads engaging the corrugated steel decking 180 to joists 110. Alternatively, the fluted lead portion 144 may have a nominal diameter between about 80% and 95% of the major diameter of the threaded portion 142.

The threaded portion 142 has a major diameter, the diameter of the fastener at the tip of the thread, and a minor diameter, the diameter of the fastener at the root of the thread. The threaded portion 142 has a desired thread pitch, the distance from one thread tip to the adjacent thread tip along the length of the threads. The stand-off fastener 130 typically has a major diameter between ⅜ and ¼ inch.

The upper portion 140 may have a through hardness between about HRB 70 and HRC 40. In one alternative, the upper portion 140 may have a through hardness between about HRC 25 and HRC 34. Alternatively, at least a portion of the upper portion 140 has a through hardness between about HRB 70 and HRB 100. In one alternative, at least a portion of the upper portion 140 has a through hardness between about HRC 19 and HRC 30. In one alternative, at least a portion of the upper portion 140 has a through hardness between about HRC 26 and HRC 36. In yet another alternative, at least a portion of the upper portion 140 has a through hardness between about HRC 33 and HRC 39.

In one alternative, at least a portion of the threaded portion 142 has a through hardness between about HRC 25 and HRC 34. In one alternative, at least a portion of the threaded portion 142 has a through hardness between about HRB 70 and HRB 100. In one alternative, at least a portion of the threaded portion 142 has a through hardness between about HRC 19 and HRC 30. In one alternative, at least a portion of the threaded portion 142 has a through hardness between about HRC 26 and HRC 36. In yet another alternative, at least a portion of the threaded portion 142 has a through hardness between about HRC 33 and HRC 39. Adjacent the threaded portion 142, thread-forming portion 143 has a hardness greater than about HRC 50, and may be greater than about HRC 54. Up to five threads of the threaded portion 142 adjacent thread-forming portion 143 may be hardened to at least HRC 50 or at least HRC 54.

To further improve the speed of assembly and improve the load carrying capacity of the composite floor the shape of the thread-forming portion 143 of the stand-off fastener 130 may be selected from the group consisting of bilobular, trilobular, quadlobular and pentalobular. Of these the quadlobular shape has been found to date to give the best performance in thread forming. In any event, these lobar shapes of the thread-forming portion 143 of the fastener 130 control the thread-forming torque to facilitate assembly of the composite floor system 100 and reduce failures in installation of the stand-off fasteners 130 and improve the load carrying capacity of the assembled composite floor system 100.

Figure 4D:
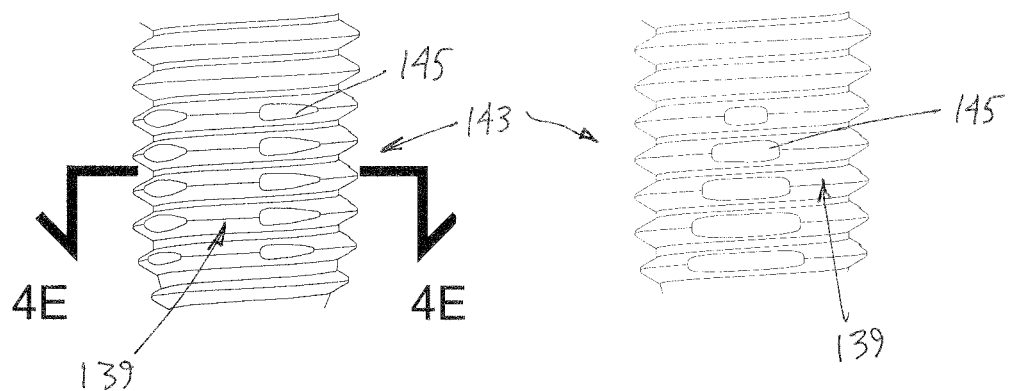
FIG. 4D is an enlarged view of alternative thread-forming portions of one of the stand-off fasteners shown in FIGS. 4A, 4B and 4C.
Figure 4E:
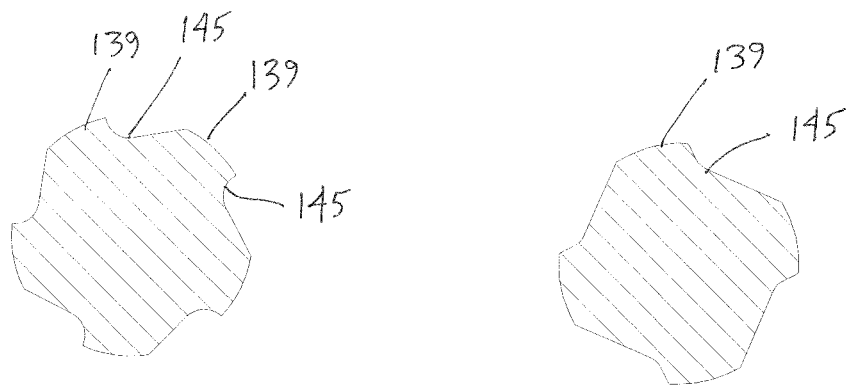
FIG. 4E are cross-sectional views of alternative pentalobular and quadlobular thread-forming portions taken as shown in FIG. 4D.

In further explanation, the thread-forming portion 143 includes a plurality of relief recesses 145 spaced around the thread-forming portion 143 to segment the thread-forming portion into a desired number of lobes 139 forming the bilobular, trilobular, quadlobular, pentalobular, or other cross-sectional shape. For example, five relief recesses 145 may be spaced as desired around the thread-forming portion 143 to segment the thread-forming portion 143 into five lobes 139 forming the pentalobular cross-section shown in FIG. 4E, and four relief recesses 145 may be spaced as desired around the thread-forming portion 143 to segment the thread-forming portion 143 into four lobes 139 forming the quadlobular cross-section also shown in FIG. 4E. The relief recesses 145 may be longitudinal recesses provided along the axial direction of the fastener. In one alternative, the width of the relief recesses 145 may be wider toward the fluted lead portion forming the triangular shape as shown in FIG. 4D. The relief recesses 145 may extend into the threads of the fastener 130 to about the minor diameter. Alternatively, the relief recesses 145 may extend into the fastener 130 deeper than the minor diameter, such as to a depth between about 80% and 99% of the minor diameter. In yet another alternative, the relief recesses 145 may extend into the threads of the fastener 130 to a depth between the major diameter and the minor diameter, such as to a depth between about 101% and 120% of the minor diameter. Each relief recess 145 may be about one thread pitch in width. Alternatively, the relief recesses 145 may be between about 0.8 and 4 thread pitches wide. In one alternative, the width of the relief recesses 145 may be between about 30% and 70% of the formula ($\pi \times$ major diameter/number of lobes) as desired to provide desired separation between the lobes 139. In yet another alternative, the width of the relief recesses 145 may be between about 40% and 65% of the formula ($\pi \times$ major diameter/number of lobes). For example, in one application having 4 lobes (quadralobular), the width of the relief recesses may be approximately 60% of the formula ($\pi \times$ major diameter/number of lobes). In another example, in one application having 2 lobes (bilobular), the width of the relief recesses may be approximately 50% of the formula ($\pi \times$ major diameter/number of lobes). The relief recesses 145 of the thread-forming portion 143 may be between about 3 to 7 thread pitches in axial length. Alternatively, the relief recesses 145 of the thread-forming portion 143 may be between 2 and 5 thread pitches in axial length. Depending upon the size of the fastener, the thread-forming portion 143 may be between about 0.06 and 0.5 inches in length, and has failure torque to thread-forming torque of at least 3.0 and may be at least 4.0.

The fluted lead portion 144 may have a swaged or pinched point, a milled point, or a combination of both. The milled point alone, or in combination with preformed swaged or pinched point, is generally desired to ensure effectiveness of the fluted lead portion 144 in drilling through the decking and upper chord of the joist. The length of the fluted lead portion 144 may be longer than the thickness of the metal decking and the flange of the upper chord of the joist. It may be useful to provide the fluted lead portion 144 having an axial length between about 1.1 and 2.0 times the thickness of the metal decking and the flange of the upper chord of the joist. The fluted lead portion 144 may be a Type 1, Type 2, Type 3, Type 4, Type 5, or a variation thereof.

The stand-off fastener 130 has a drilling torque to rotate the fluted lead portion 144 into and forming the fastener opening. Additionally, the drive torque of the threaded portion 142 is at least 20% and may at be at least 50% less than the thread-forming torque. In one alternative, the drive torque is less than 30% of the thread-forming torque. The thread-forming torque of each stand-off fastener may be no more than 100 inch-pounds. Alternatively, the drive torque is between about 5% and 50% of the thread-forming torque. To reduce driving torque, the threaded portion 142 may include back-tapered threads, and may have a thread angle less than 60°. Alternatively, the thread angle may be less than 50°. In yet another alternative, such thread angle may be between 45 and 50°. Reducing the thread angle also reduces the thread pitch and reduces the minor diameter. Back-tapered threads as used herein means that the major diameter of the threaded portion 142 adjacent the thread-forming portion 143 has a back-taper such that the major diameter is larger than the major diameter adjacent the clamping part 146. In certain embodiments, the back-taper of the major diameter may be between about 0.0005 and 0.0025 inch per inch of axial length. Alternatively, the back-taper may be between about 0.001 and 0.003 inch per inch of length.

The failure torque is substantially more than the seating torque of the fastener 130, which is more than the thread-forming torque. The threaded portion 142 of stand-off fastener 130 may have a seating torque of at least 80 inch-pounds, or between 80 and 450 inch-pounds, or greater, to provide the proper seating torque, depending on the size of the stand-off fastener 130 and type and properties of the decking, joist and other support material into which the stand-off fasteners 130 are threaded.

The threaded portion 142 of the fastener 130 may extend to within 1.5 of a thread pitch of the clamping part 146 of the fastener. The threaded portion 142 of the stand-off fastener 130 may provide a strip torque of at least 80 inch-pounds measured using a fastener having a major diameter of about ¼ inch with the fluted lead portion 144 having at least one diameter within nominal diameter between about 80% and 95% of the major diameter and installed in decking 180 and the upper chord of the joist 110 having a combined material thickness about 0.125 inch (about 3.2 millimeter). The threaded portion may have a failure torque between about 80 and 450 inch-pounds. Alternatively, the threaded portion has strip torque of between 80 and 350 inch-pounds measured using a ¼ inch diameter fastener 130 with the fluted lead portion 144 having at least one diameter within nominal diameter between about 80% and 95% of the major diameter and installed in a first and second building member having a combined material thickness of about 0.125 inch (about 3.2 millimeter). Alternatively, the threaded portion has a failure torque between 350 and 900 inch-pounds measured using a ⅜ inch fastener with the fluted lead portion 192 having at least one diameter within nominal diameter between about 80% and 98% of the major diameter and installed in a building member having a material thickness of about 0.25 inch (about 6.4 mm).

The threaded portion 142 may comply with fastener standards such as ASTM A307, ASTM A325, ASTM A354, ASTM A490, SAE J429 Grade 2, SAE J429 Grade 5, SAE J429 Grade 8, or other fastener standards. Portions of the lower portion 141 of the stand-off fastener 130 may be selectively hardened, such as the fluted lead portion 144, and the thread-forming portion 143 to a hardness of at least HRC 50. Additionally, between about 1 and 5 threads of the threaded portion 142 adjacent the thread-forming portion 143 may be hardened to at least HRC 50. By hardening only a portion of the lower portion 141 to at least HRC 50, the threaded portion 142 making the bolted connection retains physical properties as desired in compliance with ASTM A307, ASTM A325, ASTM A354, ASTM A490, SAE J429 Grade 2, SAE J429 Grade 5, SAE J429 Grade 8 or other selected fastener standards. Typically, the stand-off fasteners 130 are made with a medium carbon steel, medium carbon alloy steel, or a weathering steel in conformance with the desired fastener standard.

As shown in FIG. 4A, the clamping part 146 of the lower portion 141 of each stand-off fastener 130 may include the fastener drive head adapted to be used in installing the stand-off fastener 130, with the upper portion 140 of the stand-off fastener 130 sized to permit the stand-off fastener 130 to be installed into the decking 180 and the joist 110. In this configuration, an anchor member 148 may be provided on the upper portion 140 for engagement and encapsulation in the cementitious slab 120. The anchor member 148 may be a SEMS washer, or may be a press-fit member. As used herein, SEMS means a washer or other anchor or member held captive on the fastener where the dimension of the fastener on each side of the SEMS washer being larger than the washer hole prevents the SEMS washer from coming off. Optionally, as shown in FIG. 4A, the stand-off fastener 130 may include threads 138 adjacent the end of upper portion 140 of the fastener configured to couple to a reinforcing member such as rebar or some other member that will effectively extend the length of the stand-off fastener. In one alternative shown in FIGS. 4B and 4C, the clamping part 146 may be a SEMS washer. Alternatively, the clamping part 146 may be an integral flange. The clamping part 146 may include serrations (not shown) adjacent the threaded portion 142 to engage the surface of the upper surface of the metal decking 180, or other building member during installation. These embodiments improve the composite floor system by further reducing failures in positioning the fasteners, and at the same time reducing the time to assemble the floor system. The SEMS anchors or stake anchors are easy to produce and improve the load transfer capacity of the stand-off fasteners at the same time.

The resulting assembly improves the speed of assembly as well as improves the load carrying capacity of the composite joist floor system. The fastener 130 facilitates assembly of the composite floor system 100 and reduce failures in installation of the stand-off fasteners 130 increasing the load capacity of the assembled composite floor.

As described above and illustrated in FIGS. 1 and 2, the composite floor system is completed by providing cementitious slab 120 supported by the decking 180 and encapsulating the upper portion 140 of each stand-off fastener 130 extending above the decking a plurality of stand-off fasteners 130 installed through at least some of the valleys in the corrugated steel decking 180 and through a flange of the upper chord 112. Because of the features of the stand-off fastener, the composite floor systems can be installed with low labor costs to form a composite floor system with reduced installation errors and an improved load bearing capacity. As further illustrated, a portion of each stand-off fastener 130 continues to extend upwards above the corrugated steel decking 180 after the stand-off fastener 130 is fully installed through the decking 180 and the upper chord 112. The stand-off fastener 130 has a lower collar 149 that functions to secure the corrugated steel decking 180 to the upper chord 112. In this way, the stand-off fasteners 130 are connected to the metal decking 180 and joist upper chord 112 to the cementitious slab 120 with few defective installations, improving the installation time as well as load bearing capacity of the assembled composite floor system. In other words, these stand-off fasteners 130 cause the cementitious slab 120 to function with the upper chord of the composite joist system 100 with a much larger load carrying capacity.

In order for the stand-off fasteners 130 to more evenly transfer the horizontal shear loads along the length of the composite steel joist, the upper portion 140 of the stand-off fasteners 130 have a through hardness of between HRB 70 and HRC 40 to provide ductility. As the upper portion of the stand-off fasteners bends, shear load is shared with stand-off fasteners located throughout the length. However, in addition to being ductile enough to share the shear loads without breaking, the fluted lead portion 144 of lower portion 141 of stand-off fastener 130 must also have a hardness of at least HRC 50 to allow it to drill through the corrugated steel decking 180 and the upper chord 112 of the joist 110. To accommodate both design requirements, the stand-off fastener 130 is specially heat treated so that the lower fastener portion of the stand-off fastener 130 has sufficient hardness for drilling while the upper portion remains sufficiently ductile.

Figure 5:
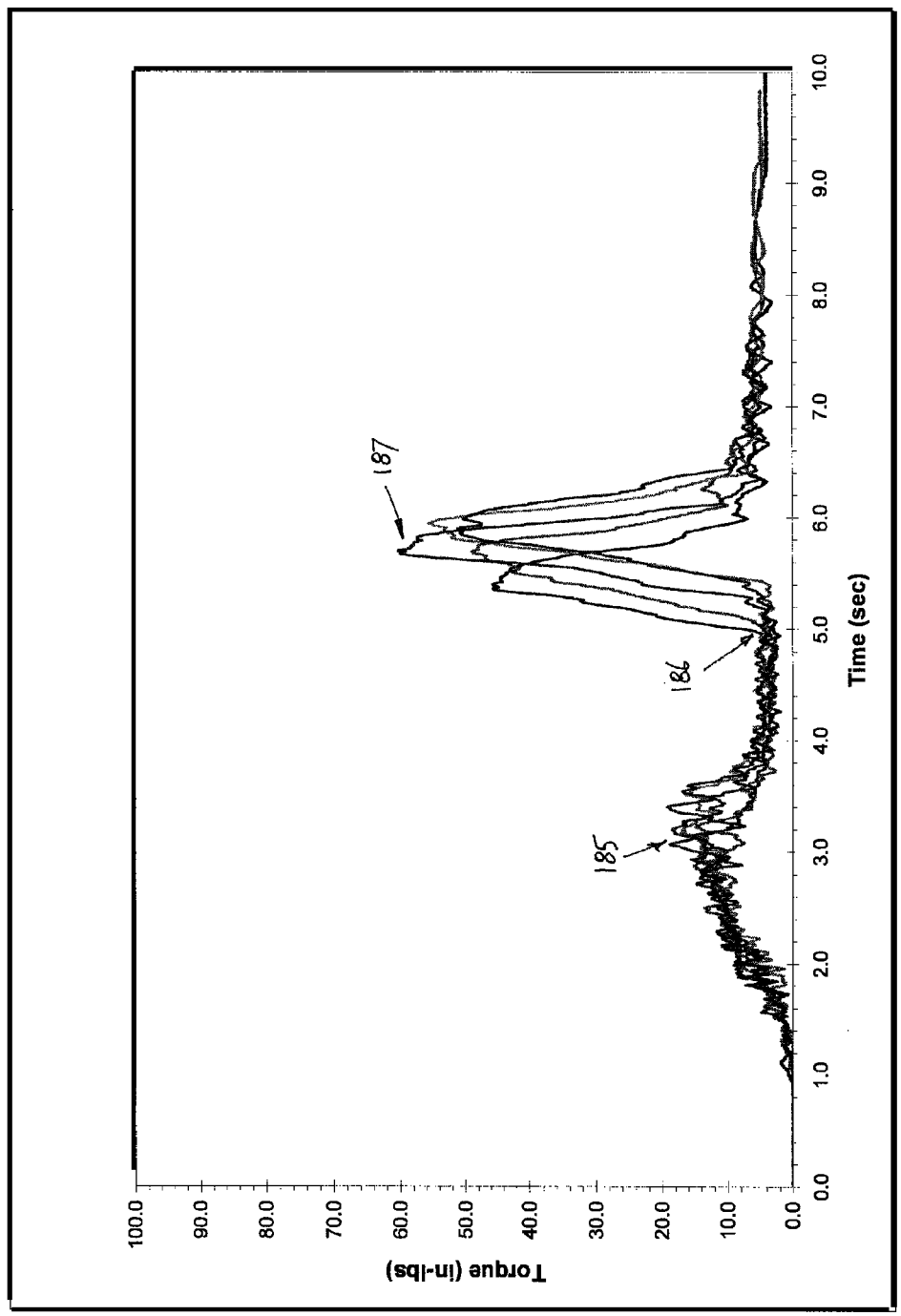
FIG. 5 is a graph of torque over time to be expected during installation of the lower portion of the stand-off fastener of FIG. 4A, 4B or 4C into two steel sheets having a combined thickness of about 0.060 inch (about 1.50 millimeter)
Figure 6:
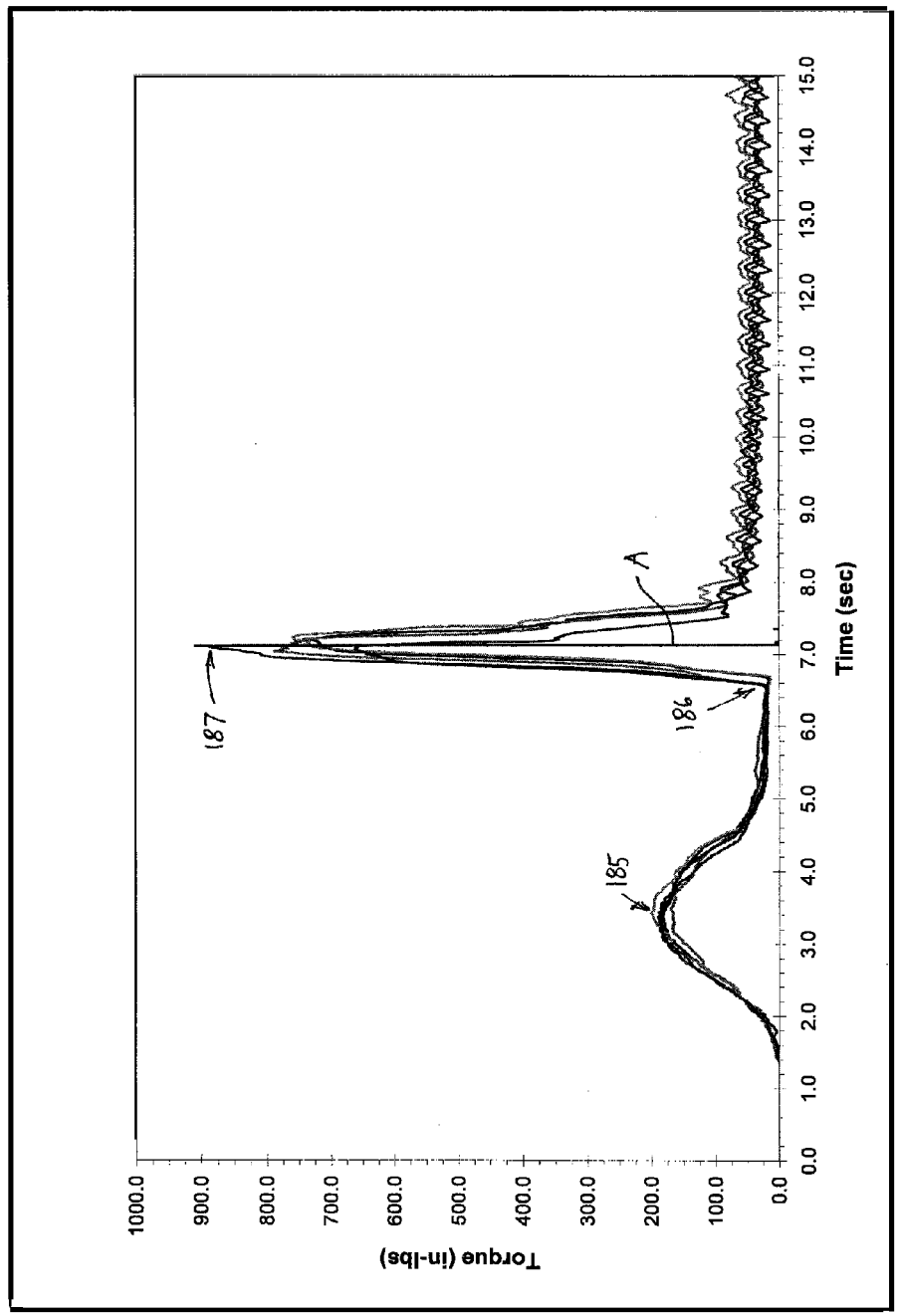
FIG. 6 is a graph of torque over time to be expected during installation of the lower portion of the stand-off fastener of FIG. 4A, 4B or 4C into a steel element having a thickness of about 0.25 inch.

FIGS. 5 and 6 graph testing the threading-forming and threaded portion of simulated stand-off fasteners. The graph plots installation torque over time being threaded into a pre-drilled pilot hole to negate effects of the fluted lead portion in a test plate of two sheet thicknesses in FIG. 5 and one plate thickness in FIG. 6. As the thread-forming portion is driven into the pilot hole, the thread-forming torque is the largest torque used to rotate the thread-forming portion of the stand-off fastener into the pilot hole forming threads in the pilot hole. After the head makes contact with the test plate, further rotation advances the threaded portion into the threaded fastener opening with increasing torque as the head clamps the members against the threads formed in the pilot hole. The operator stops tightening the fastener at a seating torque as desired lower than the failure torque 187. The seating torque is selected as desired between the drive torque and the failure torque. For some applications, the selected seating torque is greater than the thread-forming torque. Alternatively, for some applications the selected seating torque may about 80% of the failure torque. The drive torque 186 is the torque right before the torque rise to a seating torque, as shown in FIGS. 5 and 6. Continued rotation of the fastener may further increase the torque needed to turn the fastener until the connection fails at the failure torque 187. The failure mode typically is determined by the thickness of the metal decking and the flange of the upper chord of the joist and the major diameter of the fastener 130. When metal decking 180 and the flange of the upper chord of the joist 110 in which threads are formed are thin materials such as less than 14 gauge, or less than 16 gauge, the materials of metal decking and the flange of the upper chord may deform or fracture adjacent the fastener and the fastener ultimately strips-out at the failure torque. The failure torque 187 generally refers to strip torque in materials of thinner thickness. For certain material thicknesses, the fastener will fracture at the failure torque.

Shown in the graph of FIG. 5 is the installation torque over time of five samples identified as manufacturer's samples ETC040 having a major diameter of ¼ inch installed at 175 revolutions per minute into pilot holes corresponding to the fluted lead portion into two steel sheets having a combined thickness of about 0.060 inch (about 1.5 millimeters). The thread-forming torque 185 as shown in the graph of FIG. 5 is less than about 20 inch-pounds. The drive torque 186, before the torque rises to seating and then failure, is less than about 6 inch-pounds. In one sample, the failure torque 187 is greater than 40 inch-pounds. For certain samples, the failure torque is greater than 50 inch-pounds, and one sample greater than about 60 inch-pounds. The failure torque 187 shown in FIG. 5 is a strip torque. The ratio of strip torque to thread-forming torque for the stand-off fasteners may be at least 3.0 and the ratio of strip torque to drive torque is greater than 6.0 with metal sheets with a combined thickness of 0.060 inch (about 1.5 millimeters) and the pilot hole corresponding to the nominal diameter of the fluted lead portion 144 between 80 and 95% of major diameter. Alternatively, the ratio of strip torque to thread-forming torque may be at least 3.0 and the ratio of strip torque to drive torque is greater than 6.0 when the first and second steel members have a combined thickness of 0.060 inch (about 1.5 millimeter) and the nominal diameter of the fluted lead portion 144 is between 70 and 95% of major diameter. Alternatively, the ratio of strip torque to drive torque may be greater than 10, and may be as high as 25 to 50, or more, when the combined thickness of the decking and upper joist flange is 0.12 inch and the fluted lead portion having at least one diameter within nominal diameter between 80 and 95% of major diameter.

Shown in the graph of FIG. 6 is the installation torque over time for the threaded portion and thread-forming portion of the stand-off fastener 130. Five test samples identified as manufacturer's samples 360-80901-60 having a major diameter of ⅜ inch installed at 175 revolutions per minute into pilot holes corresponding to the fluted lead portion in a ¼ inch thick plate. The thread-forming torque 185 as shown in the graph of FIG. 6 is less than about 200 inch-pounds. The drive torque 186, before the torque rises to seating, is less than about 25 inch-pounds. The failure torque 187 is greater than 600 inch-pounds. For certain samples, the failure torque 187 is greater than 700 inch-pounds, and one sample greater than about 900 inch-pounds. The failure torque 187 shown in FIG. 5 is a strip torque for 4 of the 5 samples. The trace identified as "A" in FIG. 6 shows a drop to 0 inch-pounds after reaching the failure torque because fastener A fractured at the failure torque. The ratio of failure torque to thread-forming torque is at least 3.0 and the ratio of failure torque to drive torque is greater than 10 when the steel members have a thickness of 0.25 inch (about 6.35 millimeter) and the pilot hole having at least one diameter within nominal diameter between 85 and 90% of major diameter. The ratio of failure torque to drive torque may be as high as 50 to 100, or more, when the second building member having a thickness of 0.25 inch and the fluted lead portion having at least one diameter within nominal diameter between 80 and 98% of major diameter.

Figure 7:
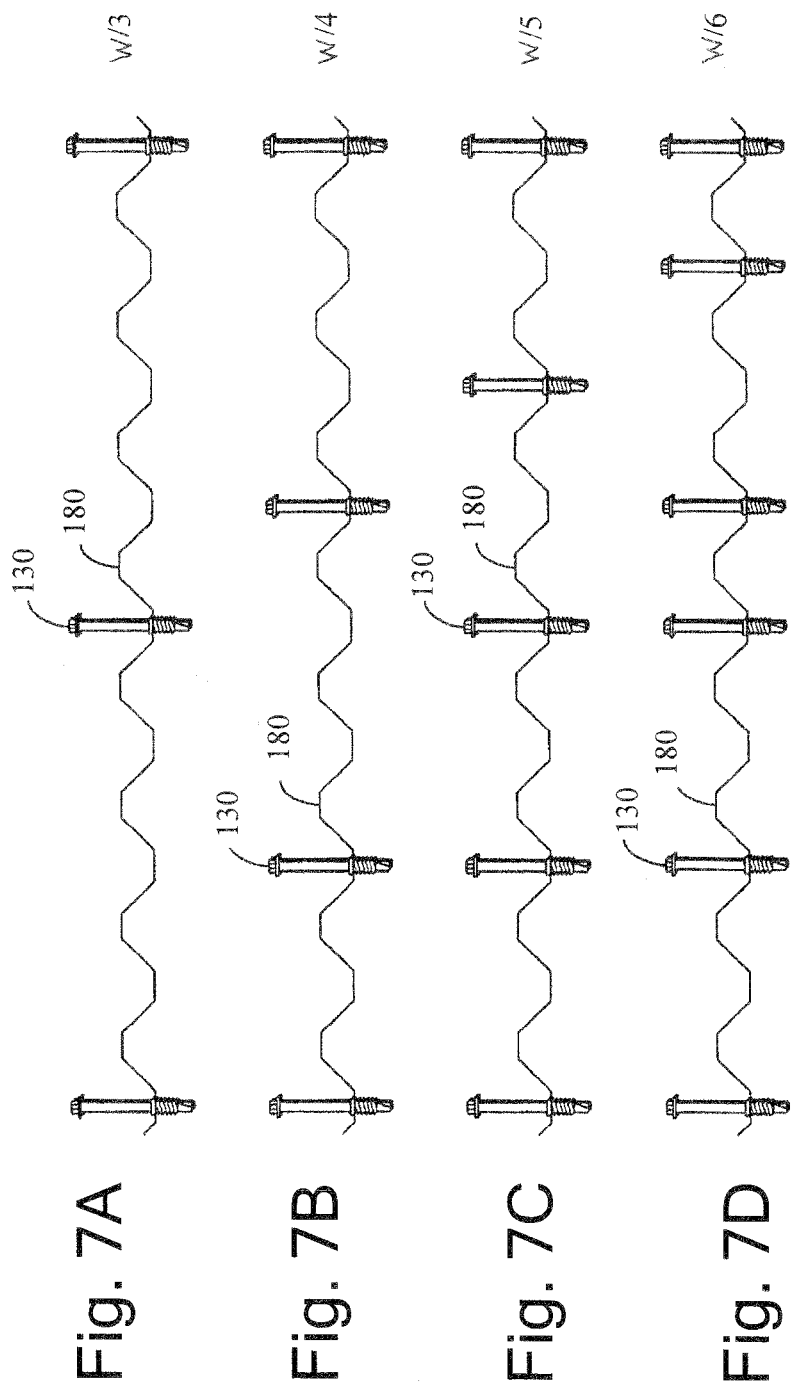
FIGS. 7A, 7B, 7C and 7D illustrate the exemplary standardized patterns of stand-off fasteners spacing that may be used in accordance with embodiments of the present invention.

Specifically, FIGS. 7A through 7D illustrate 1.0 C-type steel decking having a width W. FIG. 7A illustrates W/3 spacing where each width of corrugated steel decking 180 contains three fasteners 130. FIG. 7B illustrates W/4 spacing where each width of corrugated steel decking 180 contains four stand-off fasteners 130. FIG. 7C illustrates W/5 spacing where each width of corrugated steel decking 180 contains five stand-off fasteners 130. FIG. 7D illustrates W/6 spacing where each width of corrugated steel decking 180 contains six stand-off fasteners 130.

As illustrated in FIG. 1, stand-off fasteners 130 may drill through the upper flange of the upper chord 112 on alternating sides of the web 118. To illustrate, the quantity of stand-off fasteners may be provided in the patterns as shown from FIG. 7A through FIG. 7D for composite joist floor systems provide higher horizontal shear transfer and thus higher floor capacities.

Figure 8:
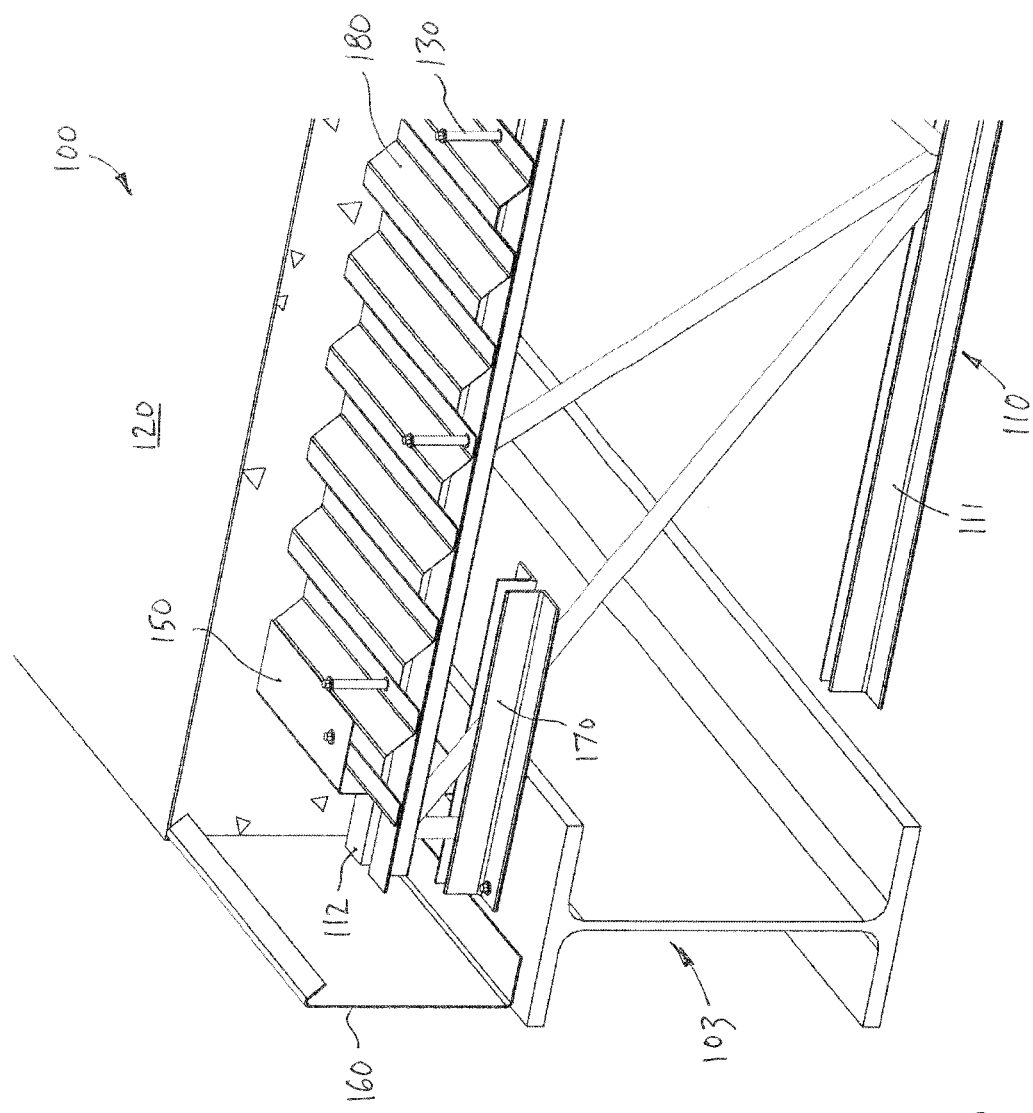
FIG. 8 illustrates a partial perspective view, with portions broken away, of a composite joist floor system in accordance with an embodiment of the present invention where the member for supporting floor joists includes a structural steel beam.

FIGS. 8-11 illustrate variations of the embodiment of the composite joist floor system described above in FIGS. 1-2. More particularly, FIG. 8 illustrates a composite joist floor system 100 in accordance with an embodiment of the present invention where the supporting member for supporting the end of the joist 110 includes a structural steel beam 103.

Figure 9:
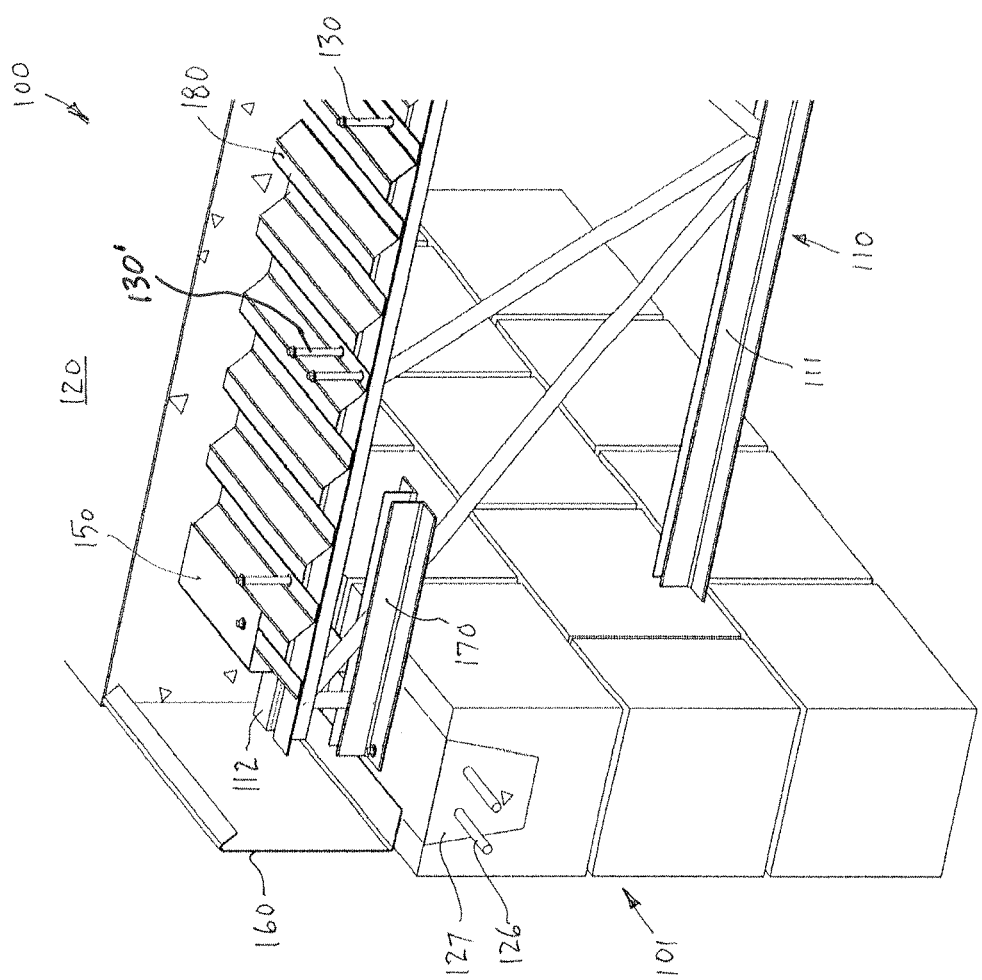
FIG. 9 illustrates a partial perspective view, with portions broken away, of a composite floor system in accordance with an embodiment of the present invention where the member for supporting floor joists includes a masonry wall, such as concrete masonry units or brick.

FIG. 9 illustrates a composite joist floor system 100 in accordance with an embodiment of the present invention where the supporting member for supporting the end of the joist 110 includes a masonry wall 101, such as a concrete block or a brick wall. In such an embodiment, the masonry wall 101 may include a concrete-filled channel 127 running through the uppermost blocks or bricks in the wall 101 so that masonry fasteners may be inserted into the concrete to hold, for example, the pour stop 160 or the joist shoe 170 in place, so that the forces from the cementitious floor slab 120 are more evenly distributed throughout the wall structure 101. As also illustrated in FIG. 9, the concrete-filled channel 127 may have rebar 126 provided therein for reinforcing the concrete in the channel. FIG. 9 also illustrates another embodiment where the corrugated steel decking 180 has an adjacent stand-off fasteners 130' located in the same valley of the corrugated steel decking as stand-off fastener 130.

Figure 10:
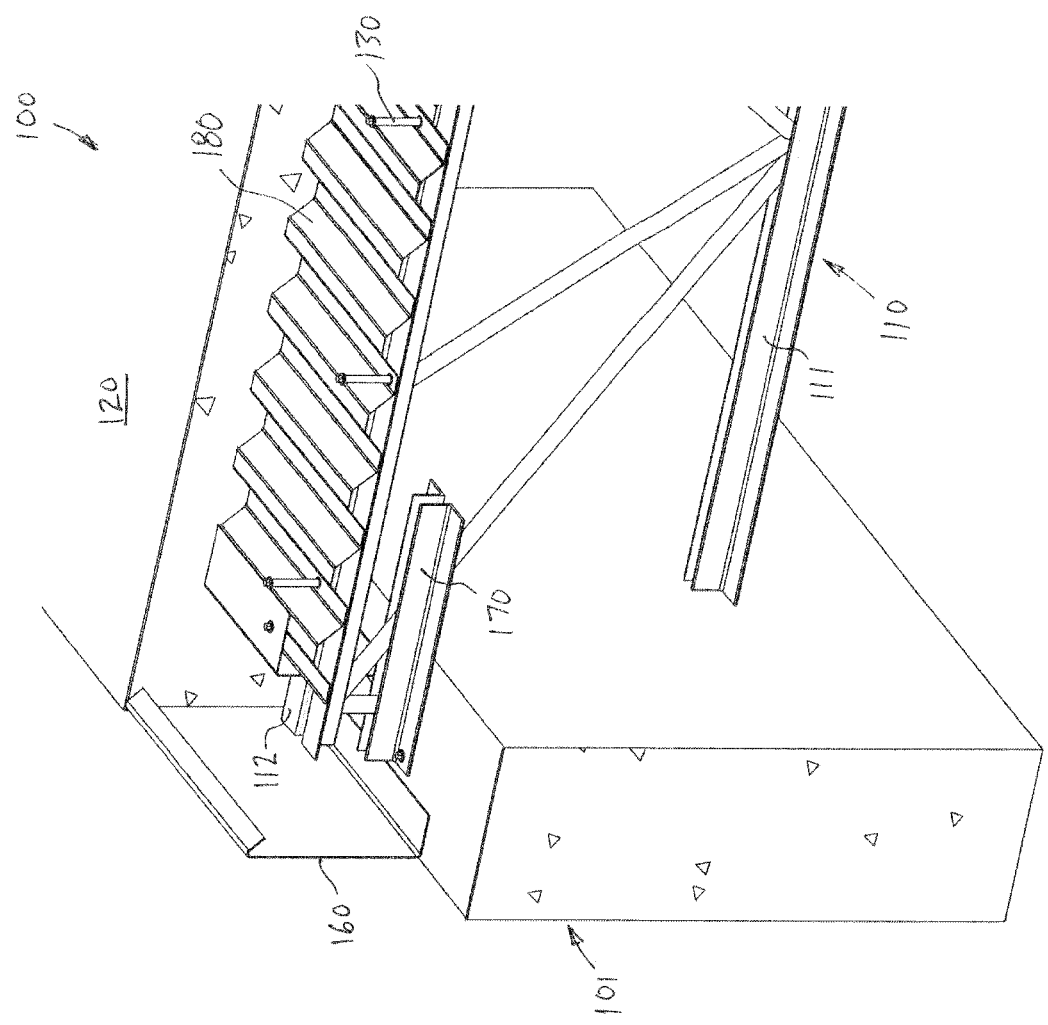
FIG. 10 illustrates a partial perspective view, with portions broken away, of a composite joist floor system in accordance with an embodiment of the present invention where the supporting member for supporting floor joists includes a concrete wall.
Figure 11:
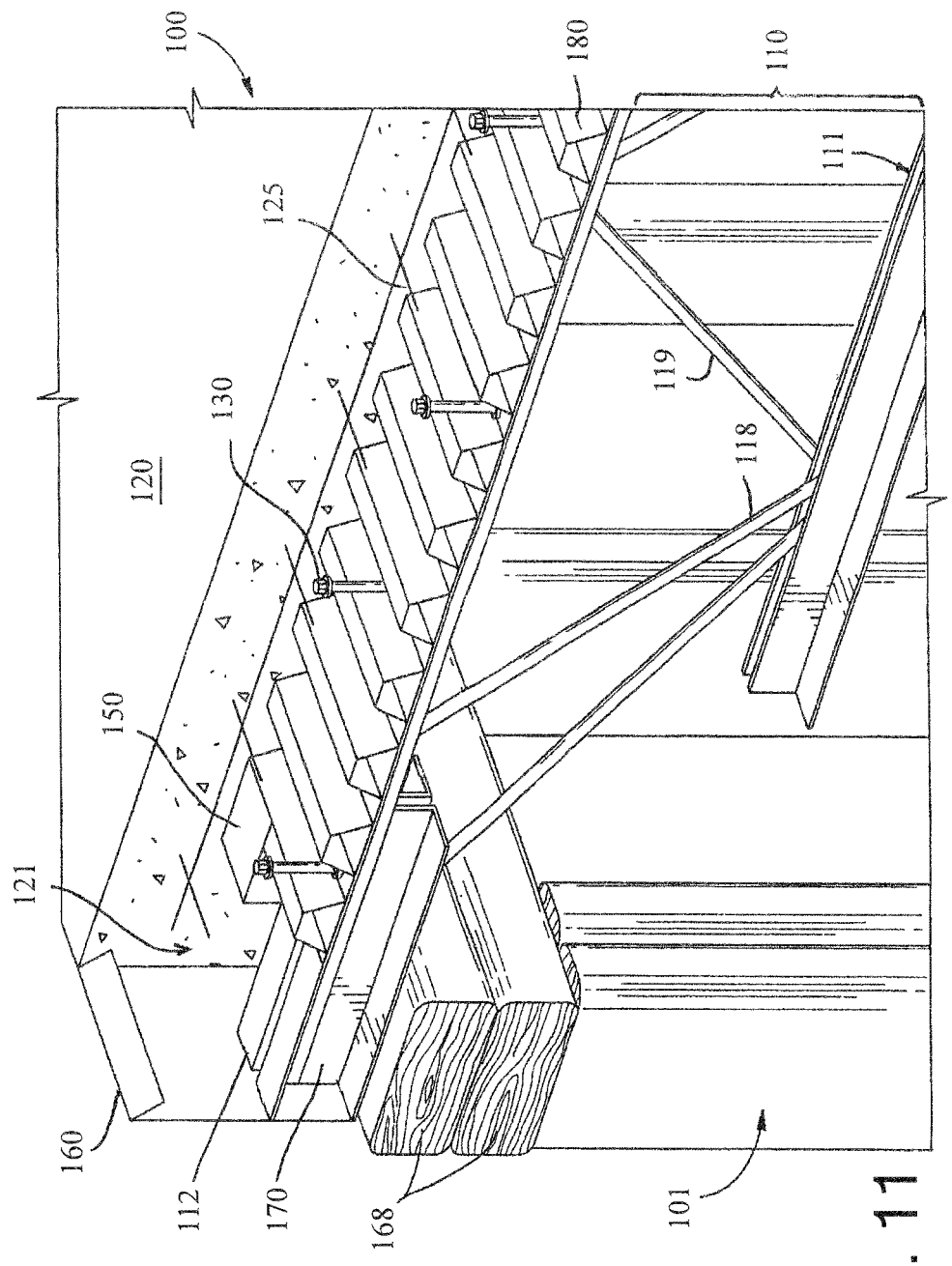
FIG. 11 illustrates a partial perspective view, with portions broken away, of a composite joist floor system in accordance with an embodiment of the present invention where the supporting member for supporting floor joists includes a wood wall.

FIG. 10 illustrates a composite joist floor system 100 in accordance with an embodiment of the present invention where the supporting member for supporting the end of the joist 110 includes a concrete wall 101. FIG. 11 illustrates a composite joist floor system 100 in accordance with an embodiment of the present invention where the supporting member for supporting the end of the joist 110 includes a wall structure 101 comprising wood studs. In such an embodiment, the wood stud wall structure may include a wood top plate and/or the load distribution member 168 to distribute the force from the cementitious slab 120 throughout the wall structure 101. As illustrated, all of the floor systems shown in FIGS. 8-11 utilize many of the same structures and configurations describe above with reference to FIGS. 1-2.

Figure 12:
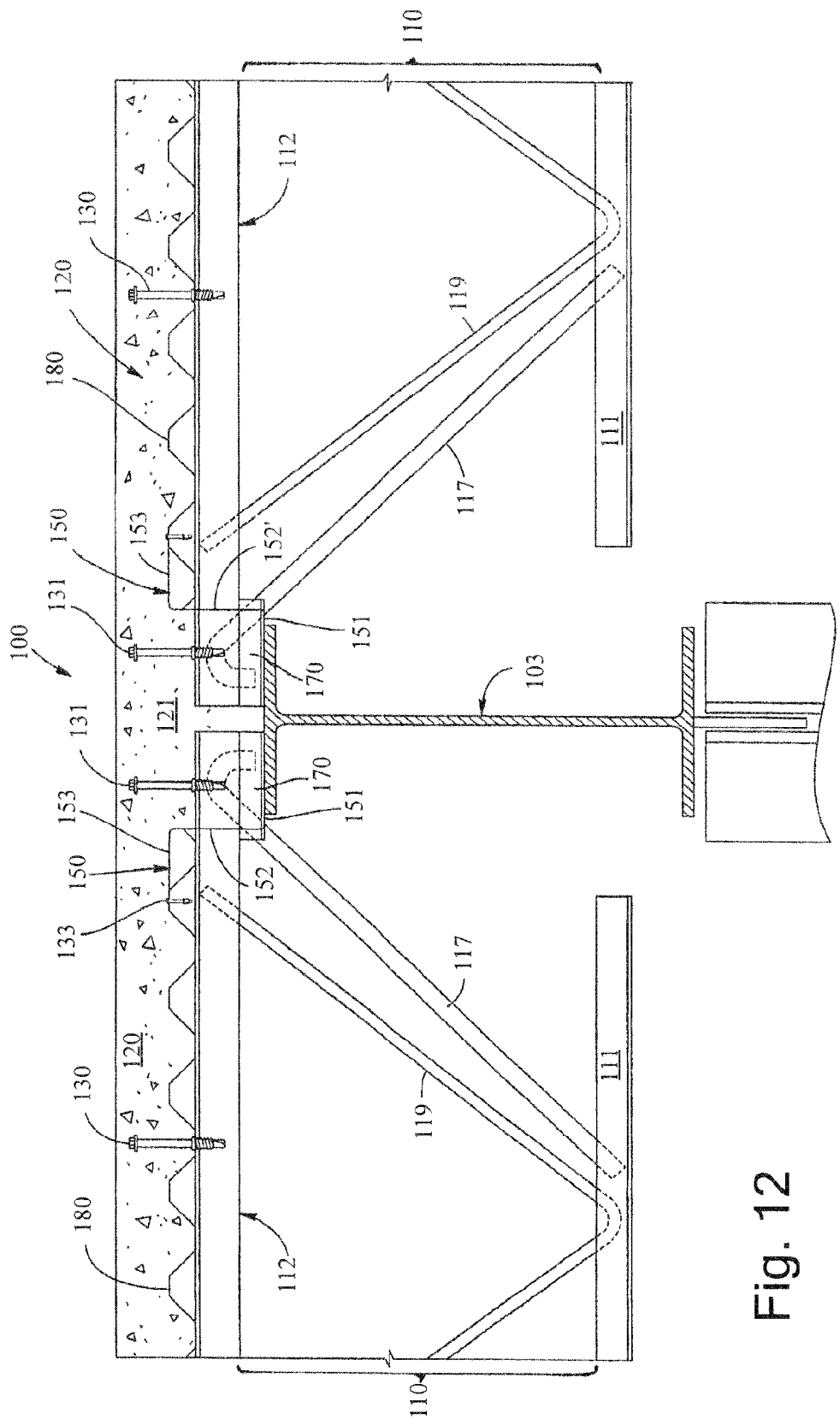
FIG. 12 illustrates a partial cross-sectional side view of a composite joist floor system showing an I-beam support for floor joists extending in opposite directions in accordance with an embodiment of the present invention.

FIG. 12 illustrates a sectional side view of composite joist floor system 100 showing how an I-beam 103 to support the ends of two joists 110 on opposite sides of the beam 103 extending in opposite directions in accordance with an embodiment of the present invention. Similar to the joist described above with respect to FIGS. 1 and 2, each joist 110 illustrated in FIG. 12 may include an upper chord 112 and a lower chord 111 separated by an open web formed from one or more rod-like members 119. At the end of each joist 110, a diagonal end member 117 extends from the lower chord 111 near the first web connection to the end of the upper chord 112 adjacent the joist shoe 170. Shoes 170 are attached to the ends of the upper chords 112 to form an I-beam configuration at the end of each joist 110. The bottom surface of each shoe 170 is supported by the upper surface of the beam 103.

In the illustrated embodiment, the ends of the joists are configured such that they extend less than halfway across the beam 103, thereby creating a gap between the ends of the opposing joists. In illustrated FIG. 12, the ends of the opposing joists 110 are seated on the beam 103 at approximately the same location along the beams axis. In other embodiments, however, the opposing joists 110 may be staggered along the axis of the beam 103.

As further illustrated by FIG. 12, each joist 110 supports corrugated steel decking 180. The corrugated steel decking 180 is positioned such that the corrugations run lateral to the joists 110. The corrugated steel decking 180 is also positioned such that the corrugated steel decking 180 on either side of the beam 103 ends at or before the beam 103. By ending the corrugated steel decking 180 at or before the beam 103, an opening is created above the beam 103 that exposes the top of the beam, the ends of the upper chords, and the ends of the joist shoes. Stand-off fasteners 130 are also are installed in above the beam 103 so that when cementitious material is placed over the corrugated steel decking 180 to form the slab 120, the cementitious material is permitted to flow into the opening above the beam 103 to create a composite distribution/collector beam 121 extending above the steel beam 103, with the stand-off fasteners the ends of the upper chords and the joist shoes encapsulated in the cementitious slab 120. Z-shaped closures 150 are positioned on either side of the beam 103 to form the wall forms of a channel that the concrete is placed into and, thus, form the walls of the cementitious distribution/collector beam 121.

More specifically, each z-shaped closure has a lower flange 151 that rests atop the steel beam 103. A fastener, weld, powder actuated fastener, pneumatic pin, or a variety of other fasteners may be used to couple each horizontal lower flange to the steel beam 103. The upwardly-extending upper flanges 153 of the z-shaped closures extend away from the beam 103 and at least a portion of each upper flange 153 rests atop a peak or peaks of the corrugated steel decking 180. A fastener 133 may be used to couple upper flange 153 to a respective peak in the corrugated steel decking 180. Each z-shaped closure 150 further includes a vertical face 152 extending between the upper flange 153 and lower flange 151 to form the upwardly-extending walls of the channel 121. As described above with respect to FIG. 3, the upwardly-extending faces 152 have cutouts 154 that allow the closures 150 to fit around the contours of the I-beam 103 created by the ends of the upper chords 112 and the joist shoes 170.

As described above with respect to the FIGS. 1 and 2, stand-off fasteners 130 are positioned through the corrugated steel decking 180 and the upper chords 112 of the joist 110 in at least some of the valleys of the corrugated steel decking 180. In some embodiments, stand-off fasteners 130 are also threaded through the flanges of the upper chords 112 proximate the ends of the upper chords 112 in the region above the steel beam 103.

FIG. 13 illustrates a sectional side view of a composite joist floor system 100 showing where the corrugated steel decking 180 is supported at its edge by a wall structure 101 that runs along the joists 110. The wall structure 101 may, for example, comprise a plurality of steel studs. The wall structure 101 includes the cold-formed wall track 167 along the upper portion of the wall to distribute forces from the composite joist floor to the load bearing wall studs. A stand-off fastener 130 may be drilled through a valley in the corrugated decking 180 and into the cold-formed wall track 167 to couple the edge of the cementitious floor slab 120 to the wall 101. In some embodiments, the stand-off fastener 130 may be a stand-off fastener as described above with respect to FIG. 4A 4B or 4C.

As further illustrated in FIG. 13, the corrugated steel decking 180 may, in some embodiments, only extend over a portion of the supporting wall 101 so that the un-cured cementitious slab 120 can flow over the edge of the corrugated steel decking 180 and onto the upper portion of the cold-formed wall track 167 to form a cementitious beam 121 in the upper portion of the wall structure. If the composite floor is to end at the edge of the wall structure 101, a pour stop 160, such as the pour stop described above with respect to FIGS. 1 and 2, may be used to contain and form the un-cured cementitious slab 120 during cementitious material placement.

As further illustrated, one or more stand-off fasteners 131 may be drilled through the cold-formed wall track 167 in the region over the wall structure 101 beyond the edge of the corrugated steel decking 180. As will be described in greater detail below, using stand-off fasteners 131 in this manner at the upper portion of the wall structure 101 or other supporting members can provide significant structural advantages. For example, in some embodiments, the upper portion of the wall structure 101 is the cold-formed wall track 167, or cold-formed steel section, connecting a plurality of cold-formed steel wall studs. Optionally, the load distribution member 168 may be provided at the upper portion of the wall structure 101 such as shown in FIG. 2A. The stand-off fasteners 131 installed along the top of the wall in the cold-formed steel wall track 167 or load distribution member 168 transfer forces between the cementitious slab 120 and the upper portion of the wall structure 101 allowing the two structures to act more like a single unit. As such, the structure may be significantly stronger and/or material and labor may be reduced in the floor system. Furthermore, as will also be described in greater detail below, stand-off fasteners 131 installed at the tops of shear walls may also have significant structural advantages with regard to transferring horizontal diaphragm forces from the floor to the shear wall.

In FIG. 13, the wall structure 101 is the proper height to directly support the edge of the corrugated steel decking 180. In other embodiments, however, z-shaped closures may be used at the inside edge of the wall to support the corrugated steel decking 180. In this way, a larger cementitious material distribution/collector beam can be created in the upper portion of the wall structure that can provide various structural advantages and improve the structure's fire safety rating. For example, FIG. 14A illustrates a partial cross-sectional view of a composite joist floor system 100 where an external masonry wall 101 that is substantially parallel to the floor joist 110 supports the edge of the corrugated steel decking 180 using a z-shaped closures 150 to support the edge of the corrugated steel decking 180, in accordance with an embodiment of the present invention. Alternatively or additionally, the stand-off fasteners 131 may be used to fasten the pour stops 160 and z-shaped closures 150 to the wall structure, reducing material and labor costs.

More particularly, the z-shaped closure 150 comprises a generally lateral lower flange 151 that is coupled to the upper portion of the wall structure 101 by, for example, a masonry fastener 134. The z-shaped closure 150 further comprises an upper flange 153 that abuts and supports the lower side of the edge of the corrugated steel decking 180. Fasteners 133 may be used to couple the valleys in the corrugated steel decking 180 to the upper flanges 153 of the z-shaped closure 150. An upwardly-extending face 152 extends between the upper and lower flanges and forms the wall forms of the cementitious beam 121.

Since the wall 101 is an external wall, a pour stop 160 is used to form the exterior wall of the cementitious slab 120 and beam 121. The pour stop 160 comprises a lower flange 161 and an upwardly-extending face 152. The lower flange, 161 may be coupled to the upper portion of the wall structure 101 by, for example, a masonry fastener 134. It should be appreciated that the length of the upwardly-extending faces of the pour stop 160 and the z-shaped closure 150 determine the size of the cementitious distribution/collector beam 121 over the wall structure 101 and the distance that this beam 121 extends beneath the decking 180. Therefore, the pour stops 160 and z-shaped closures 150 can be varied to change the structural characteristics of the composite floor system 100 depending on the design requirements. The pour stops 160 and z-shaped closures 150 can also be used to alter the noise attenuating and fire containing properties of the structure. Furthermore, when the supporting structure 101 is a masonry wall such as in FIG. 14A, the height of the pour stop 160 and z-shaped closure 150 can be selected so that the height of the resulting cementitious beam 121 matches the masonry course height or some desired multiple thereof.

FIG. 14B illustrates an interior structural wall 101 extending generally parallel to the floor joists 110. Since the wall structure 101 supports corrugated decking 180 on each side of the wall 101, two z-shaped closures 150 are used to support the decking 180, respectively, and to create the channel forms for the cementitious distribution/collector beam 121 above the wall 101. Typically fire caulking is required at the upper portion of a structural wall 101 or some other fire stop must be installed in the corrugations of the metal decking 180 between the decking and wall in order to meet the proper fire safety design requirements. However, the pour stops 160 and z-shaped closures 150 can also be varied to provide the cementitious distribution/collector beam 121 over the wall structure 101 as desired to alter the noise attenuating and fire containing properties of the structure. The z-shaped closures 150 may be used to create a cementitious material beam 121 that is large enough and creates enough of a fire barrier so that additional fire proofing may not be required at the juncture between the floor and the demising wall. Additionally, stand-off fasteners (not shown) may be positioned into the upper portion of the wall structure to form a composite beam in the wall structure to provide structural support for the building. This can save significant time and cost during construction of the building structure.

Flush Seat Configuration for Composite Joist Floor System

Figure 15:
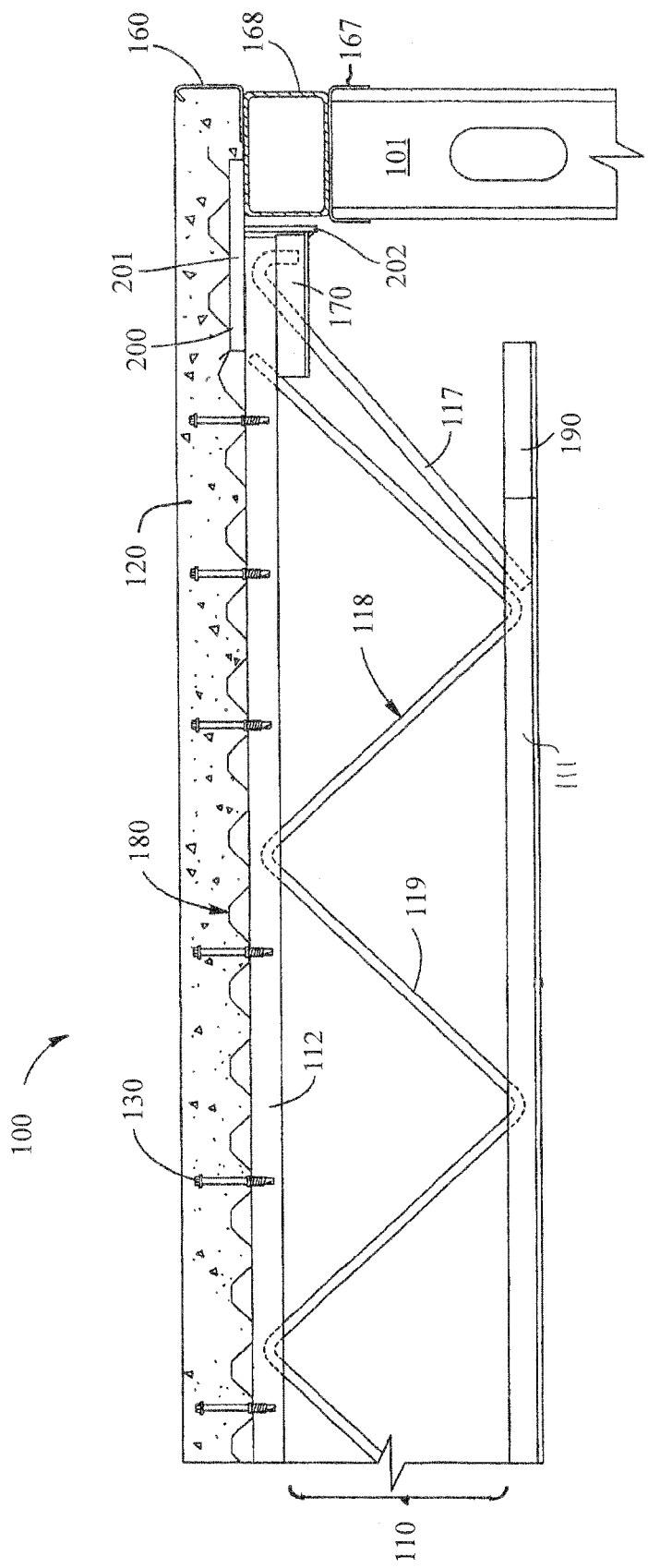
FIG. 15 illustrates a partial cross-sectional view of a composite joist floor system where the joist has a flush bearing seat supported by a support wall, in accordance with an embodiment of the present invention.

FIG. 15 illustrates a partial cross-sectional side view of a composite joist floor system 100 where the joist 110 is supported by a wall structure 101 running laterally to the joist 110 in accordance with another embodiment of the present invention. The configuration of the joist 110 and the joist shoe 170 are generally similar to the joists and joist shoes described above, however, the composite joist floor system 100 uses a "flush seat" configuration to support the end of the joist 110. A flush seat is a metal plate positioned directly on the structural support, where the metal plate may be bent to better seat the joist on the wall structure under load.

Referring to FIG. 15, in the flush seat configuration of the composite joist floor system 100 the upper chord 112 is secured such that it is substantially directly on the upper portion of the supporting member 101, with or without an intermediate distribution member 168 or header positioned at the upper portions of a supporting wall 101. The flush seat configuration includes a generally flat main plate 201 that is welded to the upper surface of the end of the upper chord 112. The horizontal plate 201 extends beyond the end of the upper chord 112 so that a portion of the plate 201 rests upon the upper portion of surface of the distribution member 168 or directly on the wall structure 101. In the illustrated embodiment, a substantially downwardly-extending plate 202 extends downward from the main plate 201 at a location on the main plate 201 just beyond the end of the upper chord 112. The downwardly-extending plate 202 extends downward typically to just below the lower surface of the joist shoe 170. Typically, the downwardly-extending plate 202 extends downward between about 1/8 inch and 1/2 inch below the lower surface of the joist shoe 170. The joist shoe 170 is welded to the joist such that it extends slightly (e.g., 1/4 of inch) beyond the end of the upper chord 112. This slight extension of the joist shoe 170 allows the downwardly-extending plate 202 to be welded to the horizontal plate 201 without interfering with the end of the joist upper chord 112. The downwardly-extending plate 202 is welded with an upwardly extending weld and a lateral weld to the bottom of the joist shoe 170 to support the vertical load on the joist shoe 170 and to minimize eccentricity on the joist end.

In the flush seat configuration illustrated in FIG. 15, the corrugated steel decking 180 extends over the main plate 201 and ends after it extends approximately half way (or, for example, at least 1.5 inches) across the supporting wall 101. As also illustrated, in some embodiments, the stand-off fasteners 130 may be installed into the joist upper chord 112 near the flush seat and positioned closer to each other than the typical spacing of the stand-off fasteners along the joist 110.

Figure 16:
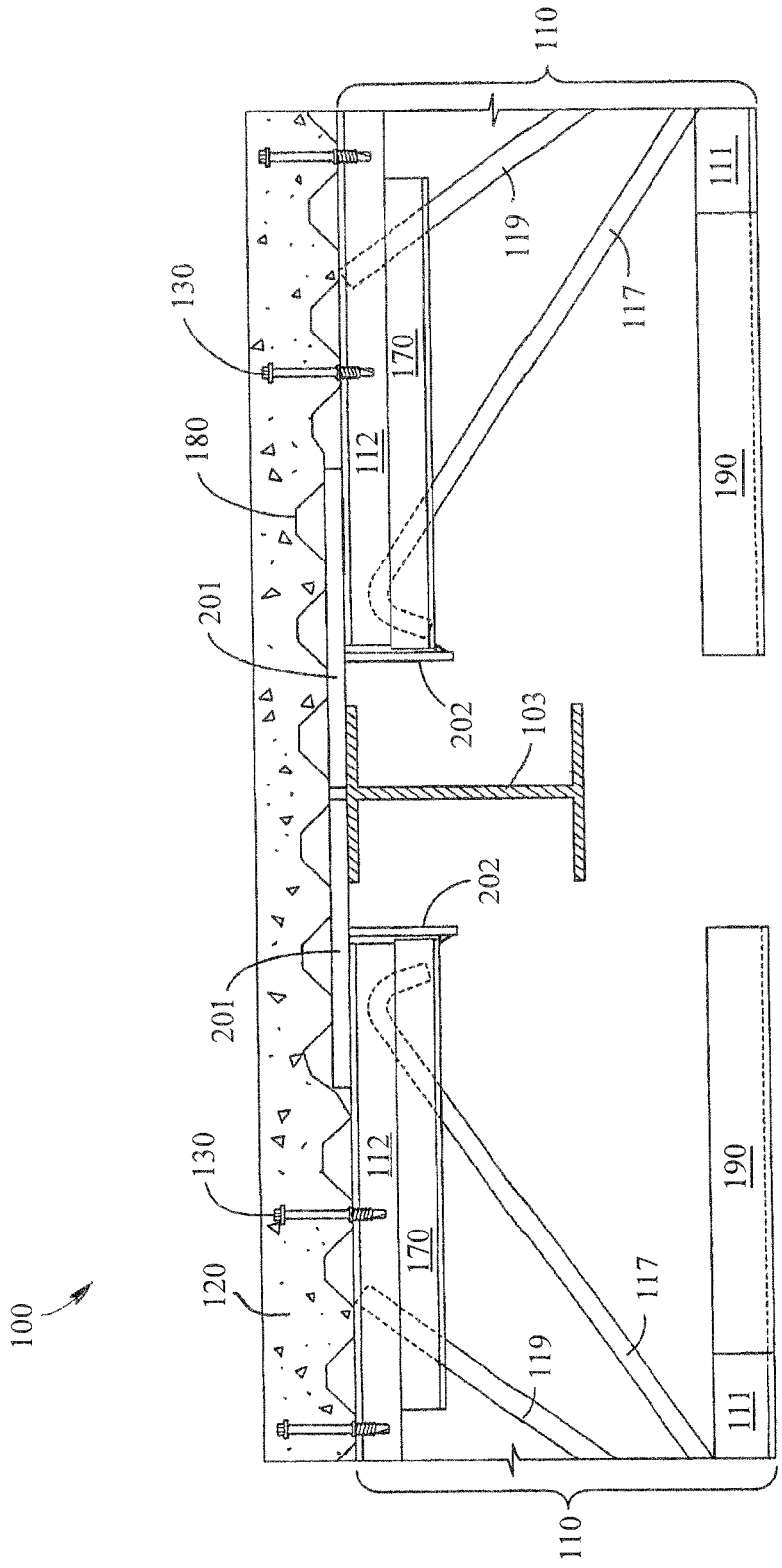
FIG. 16 illustrates a partial cross-sectional view another embodiment of two opposing joists with flush bearing seats supported by a steel beam in accordance with an embodiment of the present invention.

FIG. 16 illustrates another embodiment of a flush seat configuration where two opposing joists 110 are supported by the same steel I-beam 103. In the illustrated composite joist floor system 100, the main plates 201, the downwardly-extending plates 202, and the joist shoes 170 are each configured similar to the corresponding plates and shoes described above with reference to FIG. 15. In FIG. 16, however, the corrugated steel decking 180 extends from the first joist 110 completely over the beam 103 to the second joist 110. By reducing the space or height consumed by the joist above the structural beam 103, more space or height may be allocated for the structural beam 103 allowing for the use of a beam with a greater depth, reduced weight, and corresponding lower cost. Alternatively, the space saved by the flush seat may allow for a greater useable area between a floor and ceiling for ducting, plumbing, wiring, or other building systems.

Figure 17:
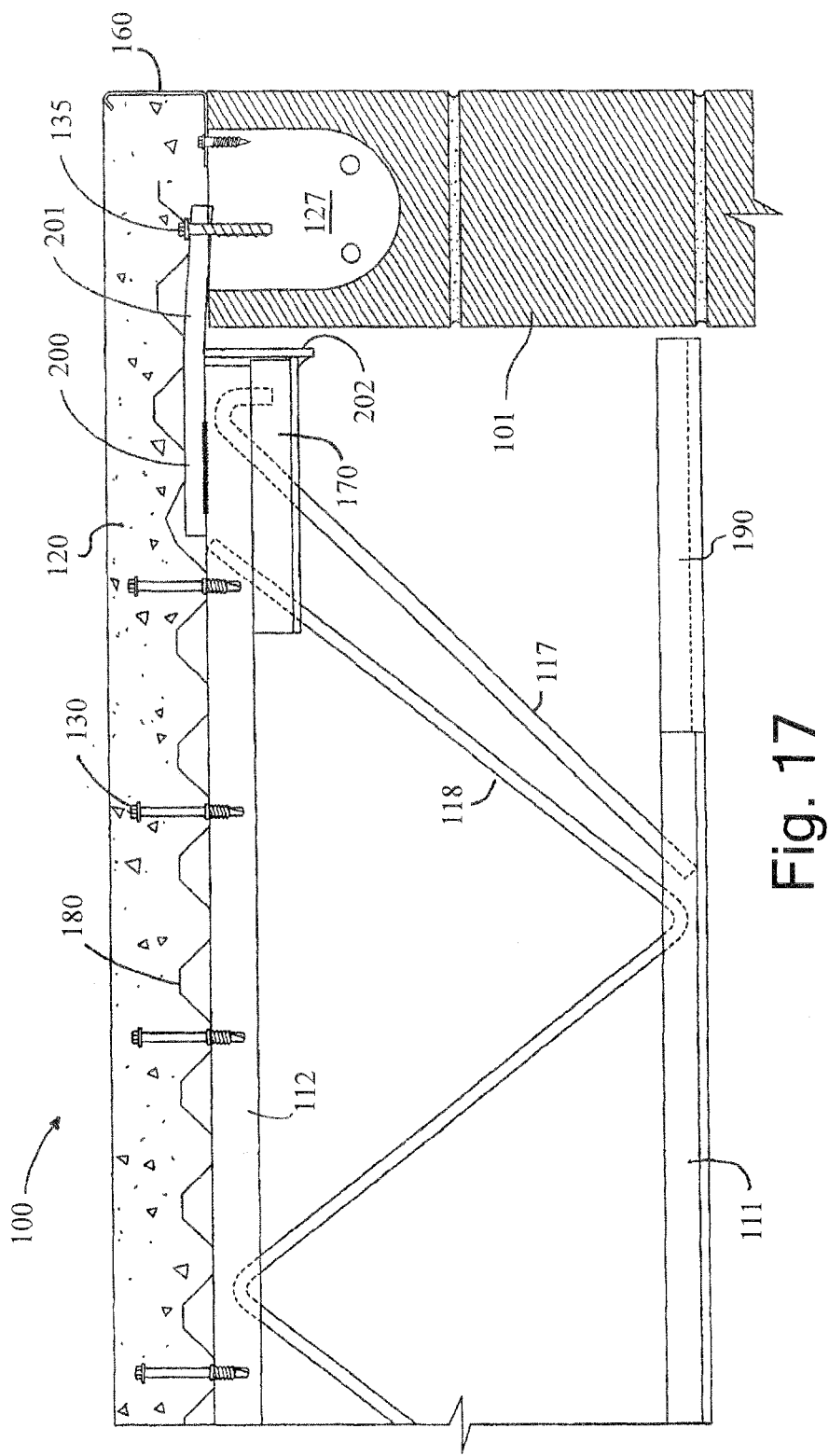
FIG. 17 illustrates a partial cross-sectional view of a flush bearing configuration where the flush bearing seat is bent to provide broad support on a masonry-type support wall in accordance with an embodiment of the present invention.

FIG. 17 illustrates another flush seat configuration of the composite joist floor system 100 where the flush bearing seat 200 is configured specifically for a masonry-type support member, such as a block wall structure, in accordance with an embodiment of the present invention. Specifically, the portion of the main plate 201 extending beyond the downwardly-extending plate 202 is bent downward. In this way, the main plate 201 is pre-bent to concentrate the downward force more toward the center of the cementitious material channel 127 rather than toward the upper inside of the top block in the masonry wall 101.

Diaphragm Attachment Using Stand-Off Fasteners

Figure 18A:
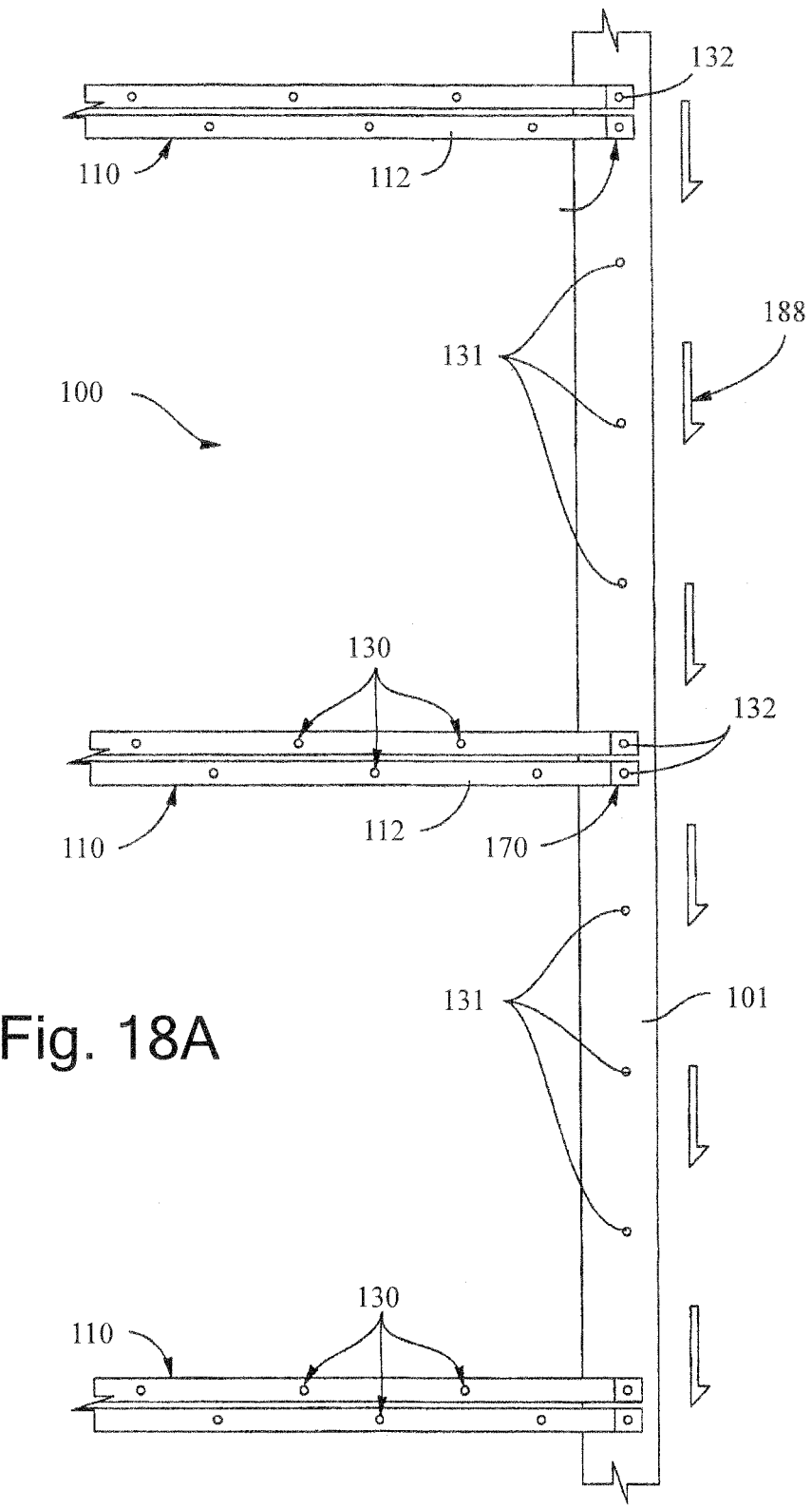
FIG. 18A illustrates a partial plan view of a composite floor system configured to transfer horizontal diaphragm shear forces from the cementitious slab to the primary support structures, in accordance with an embodiment of the present invention.
Figure 18B:
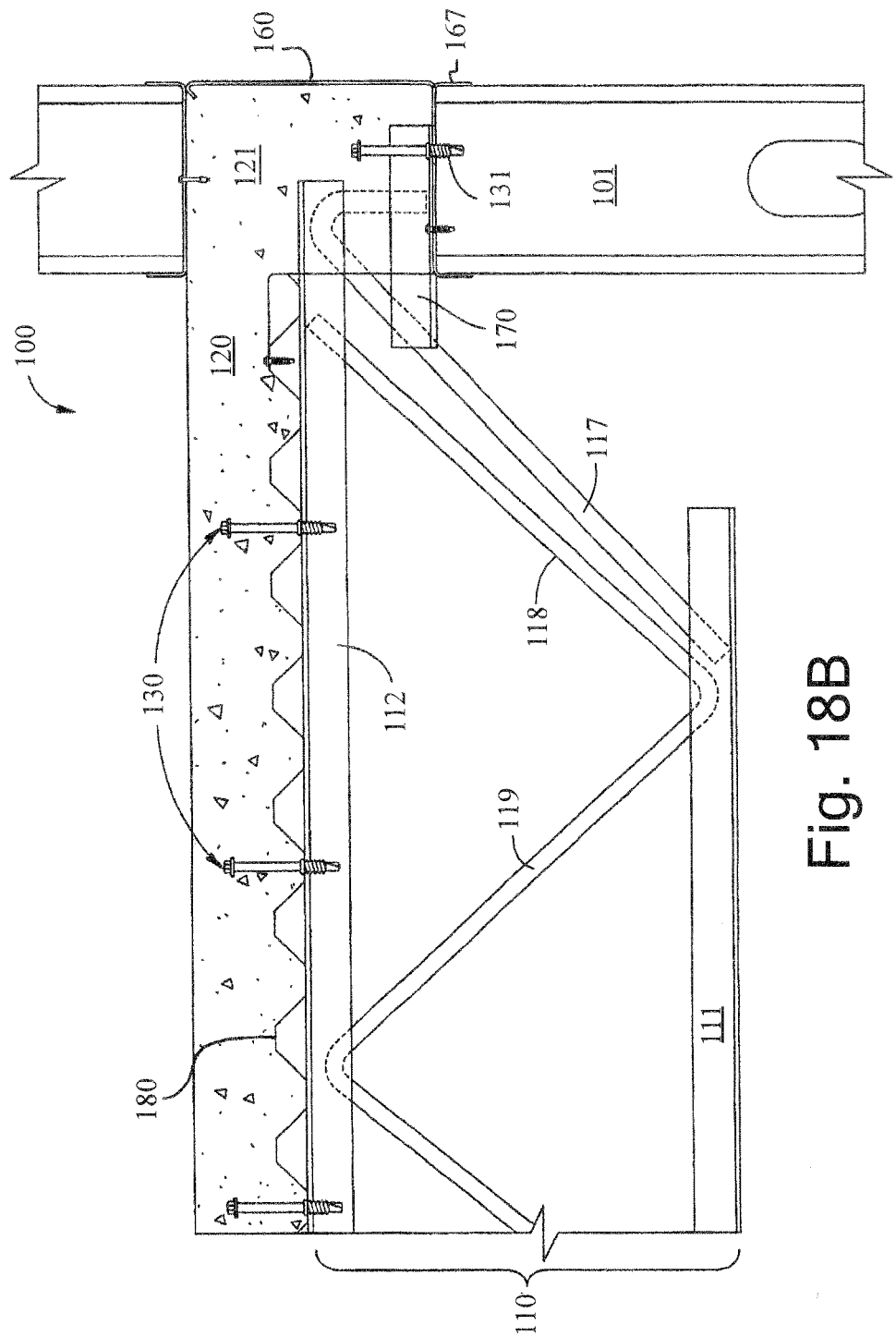
FIG. 18B illustrates a partial cross-sectional view of a composite floor system configured to transfer horizontal diaphragm shear forces from the cementitious slab to the primary support structures, in accordance with an embodiment of the present invention.

FIGS. 18A and 18B illustrate a top view and a partial cross-sectional view, respectively, of a composite floor system 100 in accordance with an embodiment of the present invention. Specifically, FIGS. 18A and 18B illustrate how the composite floor system 100 may be configured to transfer horizontal diaphragm shear forces 188 from the cementitious slab 120 to the primary support structures, such as a cold-formed steel shear-wall 101, in accordance with an embodiment of the present invention. In addition to transferring horizontal diaphragm loads 188 from the cementitious slab 120 to the wall structure, the techniques described herein also provide for the transfer of other forces between the two structures. For example, the force exerted by wind blowing against an exterior wall can be transferred from the wall structure 101 to the cementitious slab 120 more efficiently using the systems described herein. The corrugated decking 180 and the cementitious slab 120 are not shown in FIG. 18A for clarity.

As illustrated in FIGS. 18A and 18B, in addition to the friction between the cementitious slab 120 and the upper portion of the wall 101, embodiments of the present invention use two primary techniques for transferring diaphragm shear forces 188 from the cementitious slab 120 to the wall structure 101. In some embodiments of the present invention both techniques are used together, while in other embodiments of the present invention only one or none of the techniques may be used. In the first technique, the joist shoes 170 are attached to the top of the wall 101 by stand-off fasteners 131. By securing the ends of the joists 110 to the upper portion of the wall structure 101 and by using the stand-off fasteners 130 to couple the joist 110 to the cementitious slab as described above, the shear forces are transferred from the slab 120 into the joist 110 by the stand-off fasteners 130 and then from the joist 110 into the wall structure 101 by the stand-off fastener 130 to attach the joist 110 to the wall structure 101.

As illustrated in FIG. 18B, in one embodiment of the composite joist floor system 100, the joist shoes 170 extend over the supporting wall 101 beyond the end of the joist upper chord 112 so that there is sufficient room for the stand-off fasteners 131 to be drilled and threaded through the joist shoe 170 and into the upper portion of the wall structure 101. In some embodiments, stand-off fasteners are used to fasten the joist shoes 170 to the wall structure 101.

In a second technique for transferring horizontal diaphragm forces from the cementitious slab 120 to the wall structure 101, stand-off fasteners 131, which may be the same size as or a different size from the stand-off fasteners 130 installed through the decking 180 and joists 110, are installed in the upper portion of the wall structure 101 (or load distribution member, wall track, or header, as the case may be) as desired. The stand-off fasteners 131 function to transfer the diaphragm shear forces 188 from the cementitious slab 120 to the wall structure 101. As described above with reference to stand-off fastener 130, the stand-off fasteners 131 are heat treated in such a way that the lower portion of the stand-off fastener 131 has a greater hardness than the upper portion of the fastener.

FIG. 18A illustrates an exemplary embodiment of the invention where a single row of stand-off fasteners 131 are installed in the upper portion of wall structure 101. In other embodiments, more than one row of stand-off fasteners 131 may be installed into the upper portion of the wall structure 101 when desired. Where more than one row of stand-off fasteners 130 are used, the rows may be aligned and have the same fastener spacing such that each stand-off fastener 131 is installed next to a corresponding stand-off fastener in the other row(s). In other embodiments, the rows may be configured such that they are not aligned and/or have different fastener spacing such that the stand-off fasteners 131 are staggered relative to the stand-off fasteners 131 in the other row(s) as desired for the particular embodiment.

FIG. 19 illustrates a side section view of a portion of the composite floor system 100 at an external wall that is positioned along the floor joists 110, in accordance with an embodiment of the present invention. As illustrated in FIG. 19, two rows of stand-off fasteners 131 are installed in the upper portion of the wall structure 101 to transfer horizontal diaphragm forces from the cementitious slab 120 to the external wall 101. As described above, although two side-by-side rows of stand-off fasteners 131 are illustrated in the FIG. 19, in other embodiments any number of rows may be used and the rows may be staggered relative to each other.

Although FIGS. 18 and 19 illustrate external walls, the stand-off fasteners 131 can also be used in a similar manner to transfer diaphragm forces from the cementitious slab 120 to interior walls or support beams, as the case may be. In this regard, FIG. 20 illustrates an interior support wall 101 in which stand-off fasteners 131 have been installed into the upper portion of the wall structure 101 to transfer diaphragm forces from the cementitious slab 120 to the wall structure 101 in accordance with an embodiment of the present invention.

Figure 20:
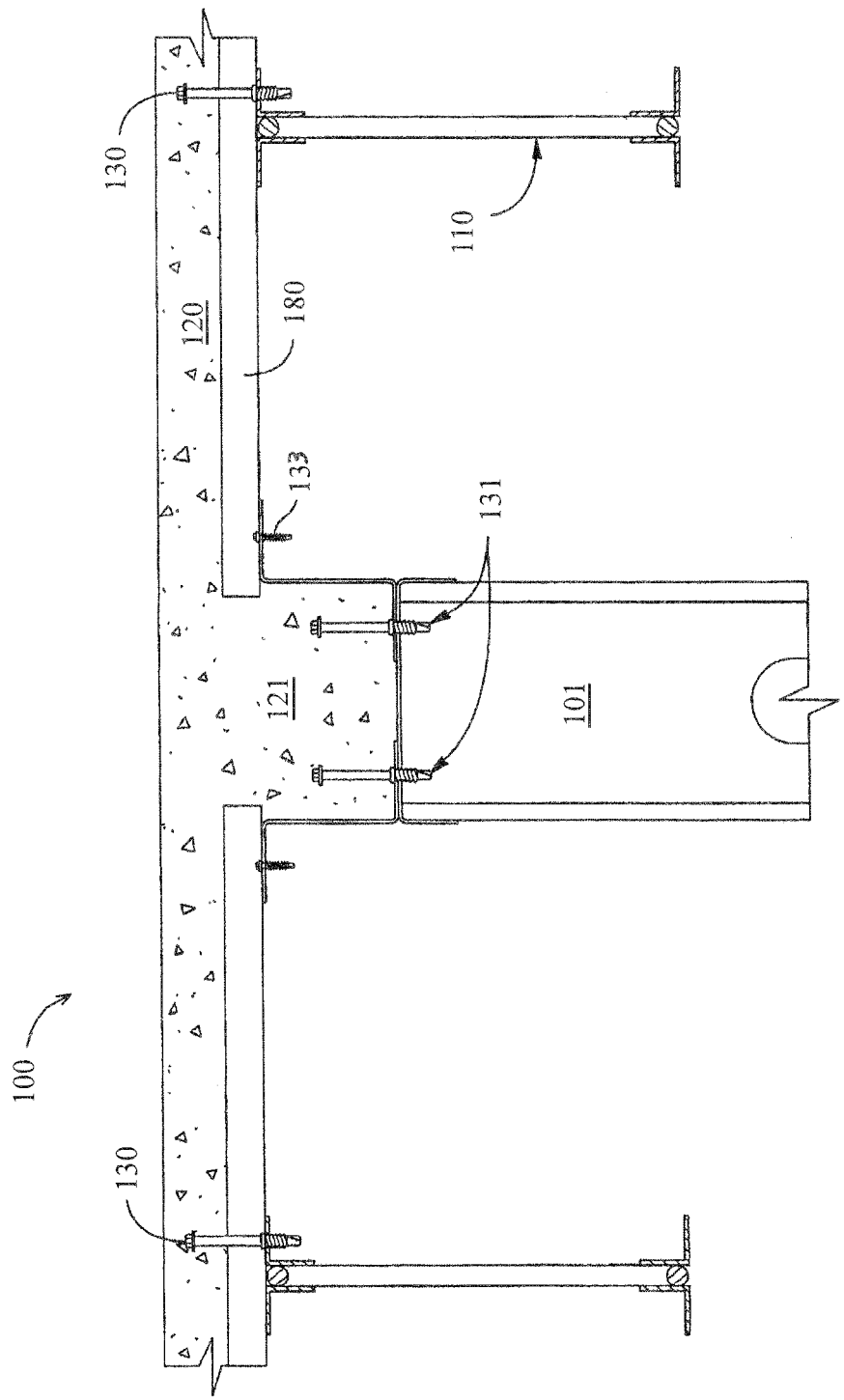
FIG. 20 illustrates a partial cross-sectional view of composite floor system with substantially parallel floor joist and an interior support wall with stand-off fasteners installed through the metal decking and into the joists and into the wall to transfer diaphragm forces from the cementitious slab to the wall in accordance with an embodiment of the present invention.

FIG. 20 illustrates an interior structural wall 101 extending generally parallel to the floor joists 110. Since the wall structure 101 supports corrugated decking 180 on each side of the wall 101, two z-shaped closures 150 are used to support the decking 180, respectively, and to create the channel forms for the cementitious distribution/collector beam 121 above the wall 101. As discussed above with reference to FIG. 14B, typically fire caulking is required at the upper portion of the structural wall 101 or some other fire stop must be installed in the corrugations of the metal decking 180 between the decking and wall in order to meet the proper fire safety design requirements. However, in this configuration, the pour stops 160 and z-shaped closures 150 can be varied to provide the cementitious distribution/collector beam 121 over the wall structure 101 as desired to alter the noise attenuating and fire containing properties of the structure. The z-shaped closures 150 may be used to create a cementitious material beam 121 that is large enough and creates enough of a fire barrier so that additional fire proofing may not be required at the juncture between the floor and the demising wall. As shown in FIG. 20, stand-off fasteners may be positioned into the upper portion of the wall structure for to form a composite beam in the wall structure to provide structural support for the building. This can save significant time and cost during construction of the building structure. Additionally, the stand-off fasteners 131 may be used to fasten the pour stops 160 and z-shaped closures 150 to the wall structure as shown in FIG. 20, reducing material and labor costs.

Furthermore, although the figures illustrate installation of the stand-off fasteners into cold-formed steel wall studs and steel distribution plates or wall tracks, the stand-off fasteners may be similarly used in support structures made of other materials. For example, standoff fasteners may be used at the upper portion of masonry wall structures or wood-framed wall structures. In such embodiments, the stand-off fasteners may be modified such that the stand-off fasteners have threads and hardnesses that are tailored to meet the requirements of the material being used for the support structure. Exemplary stand-off fasteners specifically configured for installation into wood or masonry support structures are described in greater detail below.

Composite Cold-Formed Steel Joist Floor System

In some embodiments of the present invention, various different types of cold-formed steel floor joists are used in addition to or as an alternative to open web steel joists. For example, FIGS. 21A, 21B and 21C illustrate three different exemplary cold-formed steel floor joists 110, 110, and 110 that can be used in the present composite joist floor system. In each of these embodiments, stand-off fasteners 130 as illustrated above in FIG. 4A, 4B or 4C are installed through the corrugated steel decking 180 and into the cold formed steel floor joist 110 and function to pull the decking 180 against the joists 110. The upper stand-off portion of the fasteners 130 are then encapsulated in the cementitious slab 120 providing a composite structure that increases the stiffness and load carrying capacity of the composite floor system floor.

Composite Wall Panel System

Figure 22:
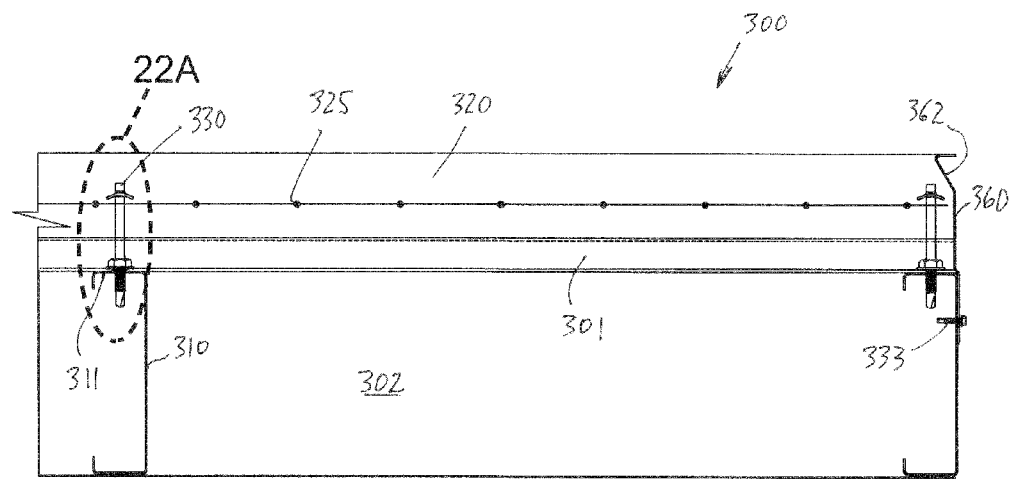
FIG. 22 illustrates a partial cross-sectional view of a composite wall system assembly with wall studs in accordance with an embodiment of the present invention.
Figure 22A:
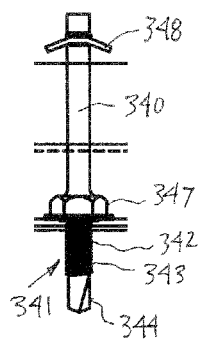
FIG. 22A is a detail view showing a stand-off fastener of FIG. 22.

Referring to FIG. 22, a composite wall panel 300 comprising a metal base 301 adapted to support placement of a cementitious material 320, and a plurality of stand-off fasteners 330 for fastening at spaced locations along the base 301, each stand-off fastener of carbon steel comprising a lower portion 341 and an upper portion 340. As shown in FIG. 22A, the lower portion 341 has a threaded portion 342, a thread-forming portion 343 adjacent the threaded portion 342 adapted to enable the fastener 330 to form threads in the base 301, and a fluted lead portion 344 adjacent thread-forming portion 343 with a nominal diameter between 80 and 98% of major diameter of the threaded portion 342 adapted to form a fastener opening in the base 301. When installed, at least a portion of the upper portion 340 of each stand-off fastener 330 extends significantly above the base 301, and a cementitious slab 320 formed on the base 301 and encapsulating the upper portion 340 of each stand-off fastener extending above the base 301 to form a desired wall surface of the panel system 300.

The wall panel system 300 has the metal base 301, cementitious slab 320 and stand-off fasteners 330 as an integral wall system that can provide a desired wall surface where cracking of the cementitious slab is inhibited if not eliminated. The wall panel system 300 may be used either as an inside wall system or and outside wall system as explained in more detail below with reference to the drawings. The cementitious slab 320 may have any surface desired either for inside walls or outside walls. The metal base 301 may be corrugated metal decking as shown in FIG. 22, and the stand-off fasteners 330 may be fastened through the base 301 to a flange 311 of metal wall studs 310. Also reinforcing 325 such as welded wire fabric or other reinforcing may provide further strengthening and durability for the cementitious slab 320.

Figure 23:
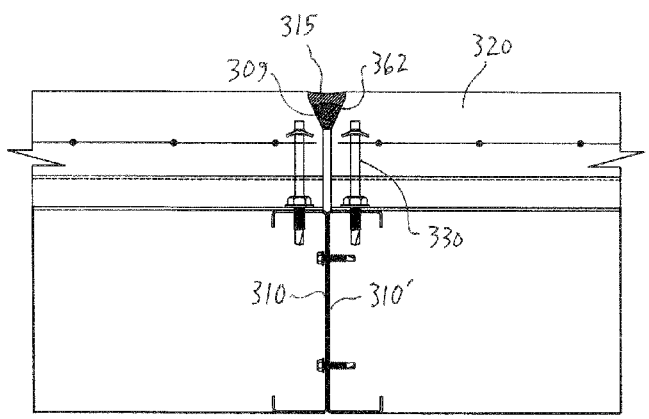
FIG. 23 illustrates a partial cross-sectional view of a connection of two wall panels of a composite wall system assembly in accordance with an embodiment of the present invention.
Figure 24:
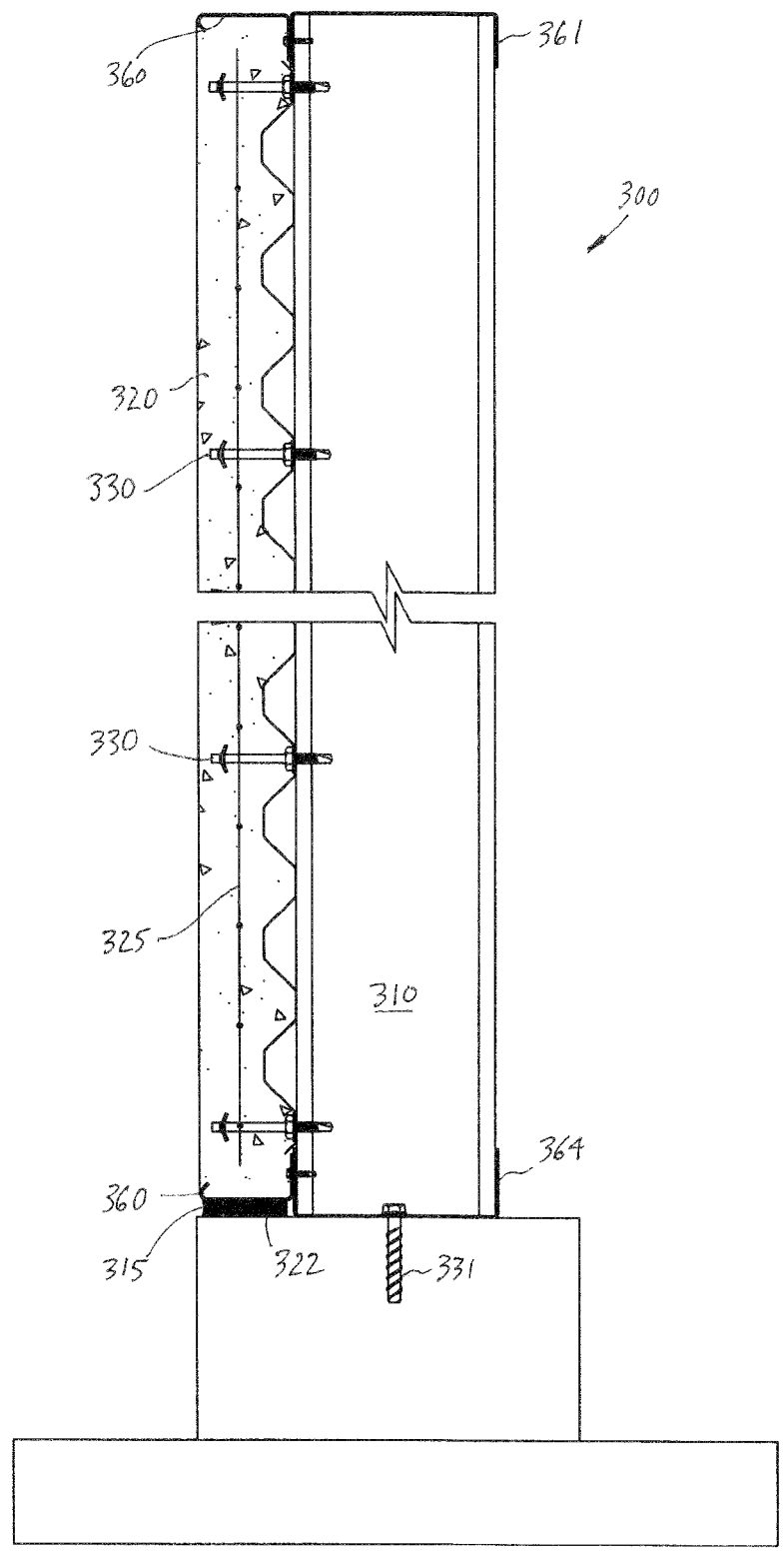
FIG. 24 illustrates a partial cross-sectional view of an installed composite wall system assembly in accordance with an embodiment of the present invention.
Figure 25:
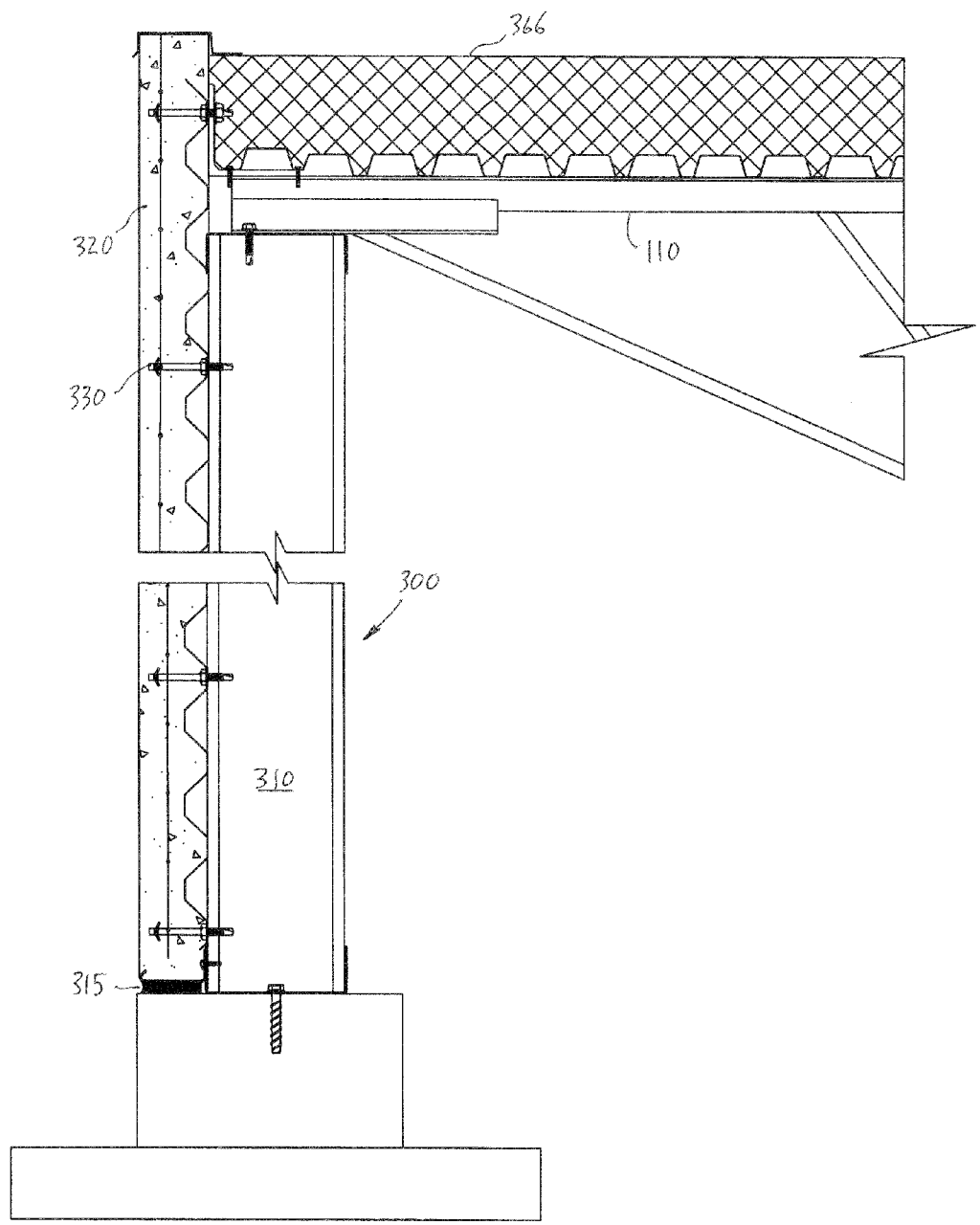
FIG. 25 illustrates a partial cross-sectional view of a composite wall system installed as an exterior wall of a building structure with a roof structure in accordance with an embodiment of the present invention.

The wall panel system 300 may be formed by providing the metal base 301 and a support structure 302 such as a support structure 302 comprising cold-formed steel wall studs 310 and installing the fasteners 330 through the base 301 and through the flanges 311 of the wall studs 310 while the support structure 302 is laying down. Alternatively, the support structure 302 may comprise other structural members such as girts, beams, or other supporting members as desired. Temporary side wall pour stops 360 may be placed around the periphery of the base 301 positioned by fasteners 333 to the support structure 302. The temporary side pour stops generally extend above the upper end of the stand-off fasteners 330 installed in the base 301, so that the outer surface of the cementitious slab 320 has a smooth surface or some other desired surface decorative or functional service with the upstanding stand-off fasteners totally embedded in the cementitious slab 320. The temporary side pour stops 360 are then typically removed as shown in FIG. 23; however, the side pour stops may be used as part of the finish wall panel system 300 as shown in FIG. 24. In any case, once the concrete forming the cementitious slab 320 is cured, the panel is brought upright and assembled in place in the building structure as shown in FIGS. 24 and 25. The pour stops 360 may be shaped and positioned such that when the wall panels are assembled, a gap is provided between the cementitious slab and the adjacent cementitious slab or other structure as shown in FIG. 23. Additionally, the side pour stops 360 may be formed to provide a chamfer 362 on the edge of the cementitious slab 320 as shown in FIG. 22 such that multiple wall panel systems 300 can be assembled butted together in the building structure with the chamfers 362 forming a groove adapted to be filled with sealing material 315. Optionally, a backer rod 309 may be provided as a backing for the sealing material 315 as shown in FIG. 23.

The stand-off fasteners 330 may be an embodiment of the stand-off fasteners illustrated in FIG. 4A, 4B or 4C. The lower portion 341 of the fasteners 330 of the wall panel system may have a threaded portion 342, thread-forming portion 343 and fluted lead portion 344. Threaded portion 342 may have a through hardness of between HRB 70 and HRC 40 and the lower portion 341 of the fastener 330 may have a failure torque to thread-forming torque ratio of at least 3.0 and a drive torque at least 20% less than a thread-forming torque. The stand-off fastener may have a drive torque no more than 50% of a thread-forming torque. In addition, the thread-forming portion 343 adjacent the threaded portion 342 of a wall panel system 300 has at least HRC 50 hardness adapted to enable the fastener to form threads in the base 301, and a fluted lead portion 344 adjacent the thread-forming portion 343 of at least HRC 50 hardness. The upper portion 340 of the stand-off fasteners have a through hardness of between HRB 70 and HRC 40 to provide ductility in the upper portion 340 of the fastener 330 to reduce cracking in the fasteners in operation in a cementitious slab 320 of the wall panel system 300. The threaded portion 342 of each stand-off fastener 330 may be of at least HRC 33 through hardness and up to five threads adjacent the thread-forming portion 343 may be hardened to at least HRC 50 hardness. The fluted lead portion 344 may have at least HRC 54 hardness.

To facilitate assembly and avoid assembly defects, the clamping portion 346 of the lower portion 341 of each stand-off fastener 330 may comprise a fastener head 347 adapted to be used in installing the stand-off fastener 330, with the upper portion 340 of the stand-off fastener 330 is sized to permit the stand-off fastener 330 to be installed into the base 301. A SEMS anchor 348 or stake anchor may be positioned on the upper portion 340 of the stand-off fastener 330 sized to permit the stand-off fastener 330 to be fastened into the base 301, with the SEMS anchor 348 or stake anchor as shown in FIG. 4A engaging in the cementitious slab 320 on installing of the fastener 330 and placement of the cementitious slab 320. These embodiments provide for easier and less time consuming installation, while improving the quality and integrity of composite wall panel system assembled.

Alternatively, a fastener head may be positioned on the upper portion 340 of each stand-off fastener 330 adapted to be used in fastening the stand-off fastener 330 to the base 301 and to engage in the cementitious slab 320 on installing of the fastener 330 and placement of the cementitious slab 320. In this embodiment, a SEMS anchor 348 may be part of the lower portion 341 of each stand-off fastener 330 and adapted to engage the base 301 and the cementitious slab 320 on placement of the cementitious slab 320.

To facilitate assembly of the wall panels 300, the thread-forming portion 343 of each stand-off fastener 330 has a shape selected from the group consisting of bilobular, trilobular, quadlobular and pentalobular.

For the wall panel systems 300, the threaded portion of each stand-off fastener 330 may meet a specification selected from the group consisting of ASTM A307, ASTM A325, ASTM A354, and ASTM A490 specification or a specification selected from the group consisting of SAE J429 Grade 2, SAE J429 Grade 5, and SAE J429 Grade 8.

As with the composite floor systems 100, the fluted lead portion 344 of the stand-off fastener 330 may have a milled point to reduce the failure rate of the stand-off fastener 330. A pinch point may be provided on the fluted lead portion 344 of the stand-off fastener 330, but as previously observed, we have found the fasteners made with a milled point are more reliable and result in less failures of the stand-off fastener, reducing assembly time and cost and producing an assembled composite wall assembly with greater load capacity.

As shown in FIG. 23, the wall panel systems 300 may be assembled together in a building structure using abutting wall studs 310 and 310' of adjacent wall panels. The composite wall systems can be assembled together by fasteners.

As shown in FIG. 24, the wall panel systems may be assembled in a building structure with the wall panel fastened to the building structure by fasteners 331. The support structure 302 may comprise cold-formed steel wall studs 310 with the wall studs 310 fitted into a lower distribution track 364 and upper distribution track 361. As shown in FIG. 24, the wall panel 300 may be fastened to the building structure through the lower distribution track 364 using the masonry fastener 331. Optionally, a bearing pad or bearing strip 322 may be positioned between the cementitious slab 320 of the wall panel 300 and the building structure, such as a Korolath™ bearing strip. Additionally, the sealing material 315 may be positioned between the wall panel 300 and the building structure.

As shown in FIG. 25, the composite wall system 300 of the present invention may be an outside wall of a building structure. The composite wall system 300 may be used as the support structure of the joist 110 supporting a roofing material 366. Alternatively, the composite wall system 300 may be used as the support structure of a joist 110 supporting the composite floor system similar to that shown in FIG. 15. These are, however, examples. It is recognized that the composite wall system 300 may used to assemble outside building walls embodying the present composite floor system 100, as well as any other building structure that may be desired by a designer.

While the invention has been described with reference to certain embodiments it will be understood by those skilled in the art that various changes may be made and equivalents may be substituted without departing from the scope of the invention. In addition, many modifications may be made to adapt a particular situation or material to the teachings of the invention without departing from its scope. Therefore, it is intended that the invention not be limited to the particular embodiments falling within the scope of the appended claims.

What is claimed is:

1. A composite joist floor system comprising:
a first support structure;
a second support structure;
a plurality of joists spaced apart and extending from the first support structure to the second support structure;
decking supported by the plurality of joists;
a plurality of stand-off fasteners adapted to be fastened through the decking to the plurality of joists, each stand-off fastener of carbon steel comprising a lower portion and an upper portion where the lower portion has a clamping part capable of clamping the decking to the joist, the lower portion having
a threaded portion adjacent the clamping part with a through hardness of between HRB 70 and HRC 40 and having the lower portion of the fastener with a thread-forming portion adjacent the threaded portion of at least HRC 50 hardness adapted to enable the fastener to form threads in an upper chord of a joist, and
a fluted lead portion adjacent the thread-forming portion of at least HRC 50 hardness with a nominal diameter between 80 and 98% of major diameter of the threaded portion adapted to form a fastener opening in an upper chord of a joist,
the thread-forming portion having a series of lobes with recesses between said lobes structured by a failure torque to thread-forming torque of at least 3.0 and a drive torque at least 20% less than a thread-forming torque,
and the upper portion of the stand-off fasteners have a through hardness of between HRB 70 and HRC 40 and when installed, at least a portion of the upper portion of each stand-off fastener extends significantly above the decking; and
a cementitious slab supported by the decking and encapsulating the upper portion of each stand-off fastener extending above the decking.

2. The composite joist floor system claimed in claim 1, the fastener has a drive torque no more than 50% of a thread-forming torque.

3. The composite joist floor system claimed in claim 1, where the lower portion of the fastener has a failure torque to thread-forming torque of at least 4.0.

4. The composite joist floor system claimed in claim 1, where the clamping portion of the lower portion of each stand-off fastener comprises a fastener drive head adapted to be used in installing the stand-off fastener and the upper portion of the stand-off fastener is sized to permit the stand-off fastener to be installed into the decking.

5. The composite joist floor system claimed in claim 4, where a SEMS anchor is positioned on the upper portion of the stand-off fastener sized to permit the stand-off fastener to be installed into the decking and a joist and the SEMS anchor engages in the cementitious slab on installing of the fastener and placement of the cementitious slab.

6. The composite joist floor system claimed in claim 5, where the SEMS anchor is mounted adjacent a threaded portion on the upper portion of the stand-off fastener.

7. The composite joist floor system claimed in claim 1, where a fastener drive head is positioned on the upper portion of each stand-off fastener adapted to be used in installing the stand-off fastener and to engage in the cementitious slab on installing of the fastener and the cementitious slab.

8. The composite joist floor system claimed in claim 7, where a SEMS anchor is part of the clamping portion of the lower portion of each stand-off fastener and adapted to engage decking or the cementitious slab on installing of the fastener in the cementitious slab.

9. The composite joist floor system claimed in claim 1, where the threaded portion of each stand-off fastener is of at least HRC 33 through hardness and up to five threads adjacent the thread-forming portion are hardened to at least HRC 50 hardness.

10. The composite joist floor system claimed in claim 1, where the fluted lead portion has at least HRC 54 hardness.

11. The composite joist floor system claimed in claim 1, where the thread-forming portion has a shape selected from the group consisting of bilobular, trilobular, quadlobular and pentalobular.

12. The composite joist floor system claimed in claim 1, where the thread-forming portion has a quadlobular shape.

13. The composite joist floor system claimed in claim 1, where the fluted lead portion of each stand-off fastener is adapted to form a fastener opening with a diameter between 80 and 95% of major diameter of the threaded portion.

14. The composite joist floor system claimed in claim 1, where the fluted lead portion of each stand-off fastener has at least HRC 50 induction hardness.

15. The composite joist floor system claimed in claim 1, where the threaded portion of each stand-off fastener has seating torque of at least 80 inch-pounds.

16. The composite joist floor system claimed in claim 1, where the threaded portion of each stand-off fastener has seating torque between 80 and 450 inch-pounds.

17. The composite joist floor system claimed in claim 1, where the threaded portion of each stand-off fastener is back-tapered by between 0.0005 and 0.003 inch per inch of length.

18. The composite joist floor system claimed in claim 1, where the threaded portion of each stand-off fastener has less than 60° thread angle and back-tapered threads.

19. The composite joist floor system claimed in claim 1, where the threaded portion of each stand-off fastener has between 45 and 50° thread angle and back-tapered threads.

20. The composite joist floor system claimed in claim 1, where the threaded portion of each stand-off fastener meets a specification selected from the group consisting of ASTM A307, ASTM A325, ASTM A354, and ASTM A490 specification.

21. The composite joist floor system claimed in claim 1, where the threaded portion of each stand-off fastener meets a specification selected from the group consisting of SAE J429 Grade 2, SAE J429 Grade 5, and SAE J429 iGrade 8.

22. The composite joist floor system claimed in claim 1, where the thread-forming portion of each stand-off fastener has thread-forming torque of no more than 100 inch-pounds.

23. The composite joist floor system claimed in claim 1, where the thread-forming portion of each stand-off fastener is between 3 and 7 thread pitches in length.

24. The composite floor system claimed in claim 1, where the fluted lead portion of each stand-off fastener has a milled point.

25. The composite floor system claimed in claim 1, where the decking comprises corrugated steel decking defining altering peaks and valleys, where the stand-off fasteners are installed in the valleys of the corrugated steel decking, and where adjacent stand-off fasteners along a joist are separated by at least one valley of the corrugated steel decking.

26. The composite floor system claimed in claim 1, where the decking comprises corrugated steel decking defining altering peaks and valleys, and where at least two adjacent stand-off fasteners are located in the same valley of the corrugated steel decking on that joist.

27. A composite joist floor system comprising:
a first support structure;
a second support structure;
a plurality of joists spaced apart and extending from the first support structure to the second support structure;
decking supported by the plurality of joists;
a plurality of stand-off fasteners adapted to be fastened through the decking to the plurality of joists, each stand-off fastener of carbon steel comprising a lower portion and an upper portion where the lower portion has a clamping part capable of clamping the decking to the joist, the lower portion having
a threaded portion adjacent the clamping part with a through hardness of between HRB 70 and HRC 40 extending to within 1.5 of a thread pitch of the clamping part and having the lower portion of the fastener with a thread-forming portion adjacent the threaded portion of at least HRC 50 hardness adapted to enable the fastener to form threads in an upper chord of a joist, and
a fluted lead portion adjacent the thread-forming portion of at least HRC 50 hardness with a nominal diameter between 80 and 98% of major diameter of the threaded portion adapted to form a fastener opening in an upper chord of a joist,
the thread-forming portion having a series of lobes with recesses between said lobes structured by a failure torque to thread-forming torque of at least 3.0 and a drive torque at least 20% less than a thread-forming torque,
and the upper portion of the stand-off fasteners have a through hardness of between HRB 70 and HRC 40 and, when installed, at least a portion of the upper portion of each stand-off fastener extends significantly above the decking; and
a cementitious slab supported by the decking and encapsulating the upper portion of each stand-off fastener extending above the decking.

28. The composite joist floor system claimed in claim 27, the fastener has a drive torque no more than 50% of a thread-forming torque.

29. The composite joist floor system claimed in claim 27, where the lower portion of the fastener has a failure torque to thread-forming torque of at least 4.0.

30. The composite joist floor system claimed in claim 27, where the clamping portion of the lower portion of each stand-off fastener comprises a fastener drive head adapted to be used in installing the stand-off fastener and the upper portion of the stand-off fastener is sized to permit the stand-off fastener to be installed into the decking.

31. The composite joist floor system claimed in claim 30, where a SEMS anchor is positioned on the upper portion of the stand-off fastener sized to permit the stand-off fastener to installed into the decking and a joist and the SEMS anchor to engage in the cementitious slab on installing of the fastener and the cementitious slab.

32. The composite joist floor system claimed in claim 31, where the SEMS anchor is mounted adjacent a threaded portion on the upper portion of the stand-off fastener.

33. The composite joist floor system claimed in claim 27, where a fastener drive head is positioned on the upper portion of each stand-off fastener adapted to be used in installing the stand-off fastener and to engage in the cementitious slab on installing of the fastener and the cementitious slab.

34. The composite joist floor system claimed in claim 33, where a SEMS anchor is part of the clamping portion of the lower portion of each stand-off fastener and adapted to engage decking or the cementitious slab on installing of the fastener in the cementitious slab.

35. The composite joist floor system claimed in claim 27, where the threaded portion of each stand-off fastener is of at least HRC 33 through hardness and up to five threads adjacent the thread-forming portion are hardened to at least HRC 50 hardness.

36. The composite joist floor system claimed in claim 27, where the fluted lead portion has at least HRC 54 hardness.

37. The composite joist floor system claimed in claim 27, where the thread-forming portion has a shape selected from the group consisting of bilobular, trilobular, quadlobular and pentalobular.

38. The composite joist floor system claimed in claim 27, where the thread-forming portion has a quadlobular shape.

39. The composite joist floor system claimed in claim 27, where the fluted lead portion of each stand-off fastener is adapted to form a fastener opening with a diameter between 80 and 95% of major diameter of the threaded portion.

40. The composite joist floor system claimed in claim 27, where the fluted lead portion of each stand-off fastener has at least HRC 50 through hardness.

41. The composite joist floor system claimed in claim 27, where the threaded portion of each stand-off fastener has seating torque of at least 80 inch-pounds.

42. The composite joist floor system claimed in claim 27, where the threaded portion of each stand-off fastener has seating torque of between 80 and 450 inch-pounds.

43. The composite joist floor system claimed in claim 27, where the threaded portion of each stand-off fastener is back-tapered by between 0.0005 and 0.003 inch per inch of length.

44. The composite joist floor system claimed in claim 27, where the threaded portion of each stand-off fastener has less than 60° thread angle and back-tapered threads.

45. The composite joist floor system claimed in claim 27, where the threaded portion of each stand-off fastener has between 45 and 50° thread angle and back-tapered threads.

46. The composite joist floor system claimed in claim 27, where the threaded portion of each stand-off fastener meets a specification selected from the group consisting of ASTM A307, ASTM A325, ASTM A354, and ASTM A490 specification.

47. The composite joist floor system claimed in claim 27, where the threaded portion of each stand-off fastener meets a specification selected from the group consisting of SAE J429 Grade 2, SAE J429 Grade 5, and SAE J429 Grade 8.

48. The composite joist floor system claimed in claim 27, where the thread-forming portion of each stand-off fastener has thread-forming torque of no more than 100 inch-pounds.

49. The composite joist floor system claimed in claim 27, where the thread-forming portion of each stand-off fastener is between 3 and 7 thread pitches in length.

50. The composite floor system claimed in claim 27, where the decking comprises corrugated steel decking defining altering peaks and valleys, where the stand-off fasteners are installed in the valleys of the corrugated steel decking, and where adjacent stand-off fasteners along a joist are separated by at least one valley of the corrugated steel decking.

51. The composite floor system claimed in claim 27, where the decking comprises corrugated steel decking defining altering peaks and valleys, and where at least two adjacent stand-off fasteners are located in the same valley of the corrugated steel decking on that joist.

52. The composite floor system claimed in claim 27, where the fluted lead portion of each stand-off fastener has a milled point.

53. A wall panel system comprising:
a metal base adapted to support placement of a cementitious material;
a plurality of stand-off fasteners for fastening at spaced locations along the base, each stand-off fastener of carbon steel comprising a lower portion and an upper portion where the lower portion has
a threaded portion with a through hardness of between HRB 70 and HRC 40 and the upper portion of the stand-off fasteners has a through hardness of between HRB 70 and HRC 40,
a thread-forming portion adjacent the threaded portion having a series of lobes with recesses between said lobes structured by a failure torque to thread-forming torque of at least 3.0 and a drive torque at least 20% less than a thread-forming torque adapted to enable the fastener to form threads in the base, and
a fluted lead portion adjacent the thread-forming portion with a nominal diameter between 80 and 98% of major diameter of the threaded portion adapted to form a fastener opening in the base, and where, when installed, at least a portion of the upper portion of each stand-off fastener extends significantly above the base; and
a cementitious slab formed on the base and encapsulating the upper portion of each stand-off fastener extending above the base to form a desired wall surface of the panel system.

54. The wall panel system as claimed in claim 53 where the thread-forming portion adjacent the threaded portion has at least HRC 50 hardness adapted to enable the fastener to form threads in the base, and a fluted lead portion adjacent the thread-forming portion of at least HRC 50 hardness.

55. The wall panel system claimed in claim 53, where the fastener has a drive torque no more than 50% of a thread-forming torque.

56. The wall panel system claimed in claim 53, where side walls are provided at least during placing and curing of the cementitious slab.

57. The wall panel system claimed in claim 53, where the base comprises corrugated metal decking.

58. The wall panel system claimed in claim 53, where the clamping portion of the lower portion of each stand-off fastener comprises a fastener drive head adapted to be used installing the stand-off fastener and the upper portion of the stand-off fastener is sized to permit the stand-off fastener to be installed into the base.

59. The wall panel system claimed in claim 58, where a SEMS anchor is positioned on the upper portion of the stand-off fastener sized to permit the stand-off fastener to fasten into the base and the SEMS anchor engages in the cementitious slab on installing of the fastener and placement of the cementitious slab.

60. The wall panel system claimed in claim 59, where the SEMS anchor is mounted adjacent a threaded portion on the upper portion of the stand-off fastener.

61. The wall panel system claimed in claim 53, where a fastener drive head is positioned on the upper portion of each stand-off fastener adapted to be used in fastening the stand-off fastener to the base and to engage in the cementitious slab on installing of the fastener and placement of the cementitious slab.

62. The wall panel system claimed in claim 61, where a SEMS anchor is part of the lower portion of each stand-off fastener and adapted to engage the base and the cementitious slab on placement of the cementitious slab.

63. The wall panel system claimed in claim 53, where the threaded portion of each stand-off fastener is of at least HRC 33 through hardness and up to five threads adjacent the thread-forming portion are hardened to at least HRC 50 hardness.

64. The wall panel system claimed in claim 53, where the fluted lead portion has at least HRC 54 hardness.

65. The wall panel system claimed in claim 53, where the thread-forming portion of each stand-off fastener has a shape selected from the group consisting of bilobular, trilobular, quadlobular and pentalobular.

66. The wall panel system claimed in claim 53, where the threaded portion of each stand-off fastener meets a specification selected from the group consisting of ASTM A307, ASTM A325, ASTM A354, and ASTM A490 specification.

67. The wall panel system claimed in claim 53, where the threaded portion of each stand-off fastener meets a specification selected from the group consisting of SAE J429 Grade 2, SAE J429 Grade 5, and SAE J429 Grade 8.

68. The wall panel system claimed in claim 53, where the fluted lead portion of each stand-off fastener has a milled point.

* * * * *